US009732198B2

(12) United States Patent
Stoll et al.

(10) Patent No.: US 9,732,198 B2
(45) Date of Patent: Aug. 15, 2017

(54) MONO- AND MULTI-LAYER BLOWN FILMS

(71) Applicant: BASF SE, Ludwigshafen (DE)

(72) Inventors: Klaus Stoll, Binzen (DE); Karl-Heinz Hornbach, Bad Bellingen (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 15/370,030

(22) Filed: Dec. 6, 2016

(65) Prior Publication Data
US 2017/0081486 A1  Mar. 23, 2017

Related U.S. Application Data

(63) Continuation of application No. 15/001,799, filed on Jan. 20, 2016, now abandoned, which is a continuation of application No. 13/774,316, filed on Feb. 22, 2013, now Pat. No. 9,278,487, which is a continuation of application No. 12/227,251, filed as application No. PCT/EP2007/052584 on Mar. 19, 2007, now abandoned.

(30) Foreign Application Priority Data

May 16, 2006  (EP) ..................................... 06114039

(51) Int. Cl.
| | |
|---|---|
| C08J 5/18 | (2006.01) |
| B29D 7/01 | (2006.01) |
| B29C 47/00 | (2006.01) |
| B32B 27/08 | (2006.01) |
| C08L 23/10 | (2006.01) |
| B29C 47/06 | (2006.01) |
| B29C 55/00 | (2006.01) |
| B29C 55/28 | (2006.01) |
| B32B 27/32 | (2006.01) |
| C08J 3/22 | (2006.01) |
| C08L 23/02 | (2006.01) |
| B29K 23/00 | (2006.01) |
| B29K 105/00 | (2006.01) |

(52) U.S. Cl.
CPC ............. *C08J 5/18* (2013.01); *B29C 47/0004* (2013.01); *B29C 47/0021* (2013.01); *B29C 47/0026* (2013.01); *B29C 47/0057* (2013.01); *B29C 47/065* (2013.01); *B29C 55/005* (2013.01); *B29C 55/28* (2013.01); *B29D 7/01* (2013.01); *B32B 27/08* (2013.01); *B32B 27/32* (2013.01); *C08J 3/22* (2013.01); *C08L 23/10* (2013.01); *B29C 47/0033* (2013.01); *B29K 2023/12* (2013.01); *B29K 2023/14* (2013.01); *B29K 2105/0005* (2013.01); *B29K 2105/0008* (2013.01); *B29K 2105/0044* (2013.01); *B29K 2105/0085* (2013.01); *B29K 2105/0094* (2013.01); *B29K 2995/0026* (2013.01); *B29K 2995/0077* (2013.01); *C08J 2323/10* (2013.01); *C08J 2323/12* (2013.01); *C08J 2323/14* (2013.01); *C08L 23/02* (2013.01)

(58) Field of Classification Search
CPC .................................................. B29C 47/0057
USPC .................................................. 264/510, 514
See application file for complete search history.

(56) References Cited

U.S. PATENT DOCUMENTS

| | | | |
|---|---|---|---|
| 3,551,540 | A | 12/1970 | Pellicciari et al. |
| 4,400,428 | A | 8/1983 | Rosenthal et al. |
| 5,491,188 | A | 2/1996 | Ikeda et al. |
| 6,270,911 | B1 | 8/2001 | Seta et al. |
| 6,300,415 | B1 | 10/2001 | Okayama et al. |
| 7,235,191 | B2 | 6/2007 | Schmidt et al. |
| 7,423,088 | B2 | 9/2008 | Mader et al. |
| 2002/0127382 | A1 | 9/2002 | Susini |
| 2003/0054161 | A1 | 3/2003 | Forte et al. |
| 2003/0207137 | A1 | 11/2003 | Kong et al. |
| 2005/0203226 | A1 | 9/2005 | Mader et al. |
| 2007/0149663 | A1 | 6/2007 | Schmidt et al. |
| 2008/0249269 | A1 | 10/2008 | Chin et al. |

FOREIGN PATENT DOCUMENTS

| | | |
|---|---|---|
| CN | 1098725 A | 2/1995 |
| EP | 0 865 911 A1 | 9/1998 |
| EP | 1 118 638 A1 | 7/2001 |
| JP | H08230014 A | 9/1996 |
| WO | WO-00/04090 A1 | 1/2000 |
| WO | WO-2004/072168 A2 | 8/2004 |

(Continued)

OTHER PUBLICATIONS

Ajji, A., et al., "Biaxial Stretching and Structure of Various LLDPE Resins." *Polymer Engineering & Science* 44, No. 2 (2004), pp. 252-260.
Bauer, et al., "TwoCcomponent Gelators and Nucleating Agents for Polypropylene Based Upon Supramolecular Assembly." *Macromolecules* 31, No. 22 (1998),pp. 7651-7658.
Behrendt, N., et al., "Charge Storage Behavior of Isotropic and Biaxially⊐ Oriented Polypropylene Films Containing α- and β-Nucleating Agents." *Journal of Applied Polymer Science* 99, No. 3 (2006), pp. 650-658.
Bhattacharya., S., et al., "Melt Rheology and Processing Variables on the Film Properties in Blown Film Extrusion," 21th Annual Meeting Polymer Jun. 23, 2005, pp. 1-12.

(Continued)

*Primary Examiner* — Timothy Kennedy
(74) *Attorney, Agent, or Firm* — Marshall, Gerstein & Borun LLP

(57) ABSTRACT

An extruded air cooled blown film having a) a total thickness of 5 to 500 μm, b) a mono-layer structure or 2 to 9 coextruded layers, c) at least one layer L containing a polymer selected from the group consisting of polypropylene homopolymers, polypropylene random copolymers, hetero-phasic polypropylene block copolymers, or any mixtures thereof, said polymer having a melt flow rate, according to ASTM D-1238, of 0.1 to 10 dg/min at 230° C. and 2.16 kg, said layer L further containing 0.001 to 2%, relative to the weight of the polymer, of a particular nucleating agent, and optionally d) a Modulus according to EN ISO 527 enhanced by at least 10% versus a reference film without the nucleating agent.

25 Claims, No Drawings

(56) References Cited

FOREIGN PATENT DOCUMENTS

| WO | WO-2005/026240 A1 | 3/2005 |
|---|---|---|
| WO | WO-2005/035598 A1 | 4/2005 |
| WO | WO-2008/122525 A1 | 10/2008 |

OTHER PUBLICATIONS

Hoffmann, K., et al., "Nucleating and Clarifying Agents for Polyolefins." In *Macromolecular Symposia*, vol. 176, No. 1, pp. 83-92. Wiley⊐ VCH Verlag GmbH, 2001.
Jacoby, P., "Nucleation and Clarity in Polypropylene," pp. 1-2.
Kotek, J., et al., "The Effect of Specific β-Nucleation on Morphology and Mechanical Behavior of Isotactic Polypropylene." *Journal of Applied Polymer Science 85*, No. 6 (2002), pp. 1174-1184.
Mohmeyer, N., et al.,"A New Class of Low-Molecular-Weight Amphiphilic Gelators." *Chemistry—A European Journal* 11, No. 3 (2005), pp. 863-872.
Mohmeyer, N., et al.,"Additives to Improve the Electret Properties of Isotactic Polypropylene." *Polymer* 48, No. 6 (2007), pp. 1612-1619.
Mohmeyer, N., et al., "Influence of Chemical Structure and Solubility of Bisamide Additives on the Nucleation of Isotactic Polypropylene and the Improvement of Its Charge Storage Properties." *Macromolecules* 39, No. 17 (2006), pp. 5760-5767.
Mohmeyer, N., et al., "Nucleation of Isotactic Polypropylene by Triphenylamine-Based Trisamide Derivatives and Their Influence on Charge-Storage Properties." *Polymer* 45, No. 19 (2004), pp. 6655-6663.
Nezbedova, E., et al., "Fracture Behaviour of β⊐ Polypropylene as a Function of Processing Conditions." In *Macromolecular Symposia*, vol. 170, No. 1, pp. 349-357. Wiley⊐ VCH Verlag GmbH, 2001.
Salis-Soglio, C., et al., "Electret Additives for Isotactic Polypropylene," Macromolecular Systems for Nanoscience—Chemistry, Physics and Engineering Aspects. CENS-BIMF Workshop 2007 Sep. 6, 2007, p. 23.
Yang, et al., "Stress-Induced Crystallization of Biaxially Oriented Polypropylene." *Journal of Applied Polymer Science* 89, No. 3 (2003), pp. 686-690.
Zatloukal, M., et al., "The Influence of Process Aids on Zig-Zag Type of Interfacial Instabilities in Multilayer Flows: Theoretical and Experimental Investigation." 21th Annual Meeting Polymer Processing Jun. 23, 2005, pp. 1-8.
Š,čudla, J., et al., "The Effect of Specific Nucleation on Molecular and Supermolecular Orientation in Isotactic Polypropylene." In *Macromolecular Symposia*, vol. 184, No. 1, pp. 371-387. Wiley⊐ VCH Verlag, 2002.
English abstract of JP8230014.

MONO- AND MULTI-LAYER BLOWN FILMS

CROSS-REFERENCE TO RELATED APPLICATIONS

This application is a continuation of U.S. patent application Ser. No. 15/001,799, filed Jan. 20, 2016, which is a continuation of U.S. patent application Ser. No. 13/774,316, filed Feb. 22, 2013, now U.S. Pat. No. 9,278,487, which is a continuation of U.S. patent application ser. No. 12/227,251, filed Nov. 12, 2008, which is a 371 of International Application No. PCT/EP2007/052584, filed Mar. 19, 2007, which claims the benefit of EP 06114039.8 filed May 16, 2006, the contents of which are hereby incorporated by reference in their entirety.

The present invention relates to a film manufactured by extrusion of a polypropylene melt into a tubular profile, which is continuously blown-up by inflated air and thereby oriented, stretched and simultaneously cooled—hereinafter referred to as "extruded air cooled blown film"; an article containing said film, a method for preparing said film and a masterbatch containing specific additives useful for the manufacture of said film.

Despite some indications in the literature and few descriptions in patents over the recent years, the economic use of polypropylene as principal component remains still difficult for the manufacture of extruded air cooled blown films under the conditions of industrial processing. Hundreds if not thousands of conventional blown film lines are predominantly used for ethylene based polymers, and corresponding polypropylene films have hardly gained commercial significance. It is commonly believed that the low melt strength of polypropylene—in contrast to polyethylene—does not allow production of such blown films on air cooled film blowing equipment with reasonable throughput at economically sensible conditions.

US-A-2003/0054161 describes non-oriented packaging films containing highly crystalline homopolymer polypropylene with a melt flow greater than 30 g/10 minutes, a nucleating agent and polypropylene.

US-A-2003/0207137 discloses a sealable multi-layer opaque film.

EP-A-1 118 638 relates to flexible syndiotactic polypropylene compositions and the corresponding molded objects.

U.S. Pat. No. 6,270,911 describes propylene-ethylene-butene random terpolymers and polypropylene-based resin compositions, their films and laminates produced in a T-die casting method.

EP-A-0 865 911 discloses a film comprising a base layer of a polypropylene-based resin including microvoids formed by stretching a polypropylene-based resin containing the beta-form of polypropylene, and a heat seal layer on the base layer.

EP-A-0 863 183 relates to polypropylene compositions for the production of molded articles.

Although the aforementioned patents disclose several compositions of polypropylene, its use for conventional cast films, mono- or multi-layer packaging materials thereof or molded articles with balanced end-use properties, none of said disclosures provides any specific teaching on the use of polypropylene homo- or copolymers or recommended compositions, allowing the production of extruded air cooled blown films under industrial conditions.

It has now surprisingly been found by the present invention that certain nucleating agents can successfully be applied to overcome the weaknesses and limitations in the use of polypropylene for blown film processes and simplify production of such films from polypropylene on air cooled blown film lines with high throughput at industrially relevant conditions. The invention discloses, furthermore, a method by which air cooled films containing one or more layers of polypropylene can be manufactured at very high and constant quality, and with excellent optical and mechanical properties.

In some cases, it is further observed that the presence of nucleating agents according to the invention allows even enhanced polymer throughput, respectively permits lower screw rotation speed of the extruder, if the total throughput and all other conditions are kept unchanged. One more essential observation is the focused and lowered frostline indicating the sharp and faster crystallization process of the polymer. While not intending to be bound by any theory, it is believed that the lowered frostline height (reduced distance between die exit and solidifying polymer) has a paramount contribution to the overall stability of the blowing process and the outstanding film quality eventually obtained.

The overall highly constant processing conditions allow broad variations of the blow-up and draw-down ratios, i.e. high bubble-stability and high orientation can be achieved. Films manufactured according to the invention are characterized by excellent optical and mechanical properties, high surface gloss and absence of melt fracture (so-called shark skin) as well as permanent stability towards plate-out or blooming of the nucleating agents incorporated. The thickness of these films, their longitudinal and transversal orientation during manufacture can be varied over a wide range. Down-gauging is possible to less than 20 µm, so that the excellent overall properties may allow the inventive films to eventually compete with mono- or biaxially oriented cast films (OPP, BOPP), if sufficiently high stretching ratios are applied.

OPP and BOPP technology is far more complex, thus more expensive than conventional air cooled blown film technology. BOPP films are typically manufactured via cast film processes with subsequent heating and stretching in ovens to achieve the desired thickness and final properties.

Besides the simplicity and economics of the overall manufacturing process, it has surprisingly been found, furthermore, that polypropylene films containing nucleating agents according to the invention show an improved behavior during transport over rolls and take-up spools. Their general handling and folding behavior on winders is characterized by reduced wrinkling, flat, even and smooth layering and minimized variation of film thickness and film width.

The present invention relates in particular to an extruded air cooled blown film, preferably a clarified film, having
a) a total thickness of 5 to 500 µm,
b) a mono-layer structure or 2 to 9 coextruded layers,
c) at least one layer L containing a polymer, preferably an isotactic polymer, selected from the group consisting of polypropylene homopolymers, polypropylene random copolymers, hetero-phasic polypropylene block copolymers, or any mixtures thereof, said polymer having a melt flow rate, according to ASTM D-1238, of 0.1 to 10 dg/min at 230° C. and 2.16 kg, said layer L further containing 0.001 to 2%, relative to the weight of the polymer, of a nucleating agent of the formula (IA), (IB) or (IC); and optionally
d) a Modulus according to EN ISO 527 enhanced by at least 10% versus a reference film without a nucleating agent of the formula (IA), (IB) or (IC);
the significance of the formulae (IA), (IB) and (IC) being:

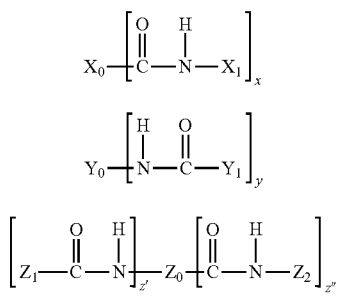

wherein
x and y are an integer from 2 to 6;
z' and z" independently of one another are an integer from 1 to 5 with the proviso that the sum of z' and z" is an integer from 2 to 6;
$X_0$ is a residue which is formed by elimination of x carboxyl groups of a saturated or unsaturated aliphatic polycarboxylic acid having 3 to 25 carbon atoms,
a residue which is formed by elimination of x carboxyl groups of a saturated or unsaturated alicyclic polycarboxylic acid having 7 to 25 carbon atoms or
a residue which is formed by elimination of x carboxyl groups of an aromatic polycarboxylic acid having 8 to 25 carbon atoms; any of said polycarboxylic acids optionally contains further hetero atoms in its skeleton;
the radicals $X_1$ independently of one another are
$C_1$-$C_{20}$alkyl unsubstituted or substituted by one or more hydroxy, amino and/or nitro groups;
$C_2$-$C_{20}$alkenyl unsubstituted or substituted by one or more hydroxy, amino and/or nitro groups;
$C_2$-$C_{20}$alkyl interrupted by oxygen or sulfur;
$C_3$-$C_{12}$cycloalkyl unsubstituted or substituted by one or more $C_1$-$C_{20}$alkyl;
($C_3$-$C_{12}$cycloalkyl)-$C_1$-$C_{10}$alkyl unsubstituted or substituted by one or more $C_1$-$C_{20}$alkyl;
bis[$C_3$-$C_{12}$cycloalkyl]-$C_1$-$C_{10}$alkyl unsubstituted or substituted by one or more $C_1$-$C_{20}$alkyl;
a bicyclic or tricyclic hydrocarbon radical with 5 to 20 carbon atoms unsubstituted or substituted by one or more $C_1$-$C_{20}$alkyl;
phenyl unsubstituted or substituted by one or more radicals selected from $C_1$-$C_{20}$alkyl, $C_1$-$C_{20}$alkoxy, $C_1$-$C_{20}$alkylamino, di($C_1$-$C_{20}$alkyl)amino, amino, hydroxy and nitro;
phenyl-$C_1$-$C_{20}$alkyl unsubstituted or substituted by one or more radicals selected from $C_1$-$C_{20}$alkyl, $C_3$-$C_{12}$cycloalkyl, phenyl, $C_1$-$C_{20}$alkoxy, amino, hydroxy and nitro;
phenylethenyl unsubstituted or substituted by one or more $C_1$-$C_{20}$alkyl;
biphenyl-($C_1$-$C_{10}$alkyl) unsubstituted or substituted by one or more $C_1$-$C_{20}$alkyl;
naphthyl unsubstituted or substituted by one or more $C_1$-$C_{20}$alkyl;
naphthyl-$C_1$-$C_{20}$alkyl unsubstituted or substituted by one or more $C_1$-$C_{20}$alkyl;
naphthoxymethyl unsubstituted or substituted by one or more $C_1$-$C_{20}$alkyl; biphenylenyl, fluorenyl, anthryl;
a 5- to 6-membered heterocyclic radical unsubstituted or substituted by one or more $C_1$-$C_{20}$alkyl;
a $C_1$-$C_{20}$hydrocarbon radical containing one or more halogen or pseudo-halogen;
tri($C_1$-$C_{10}$alkyl)silyl; or
tri($C_1$-$C_{10}$alkyl)silyl($C_1$-$C_{10}$alkyl);
$Y_0$ is a residue which is formed by elimination of y amino groups of a saturated or unsaturated aliphatic polyamine having 3 to 25 carbon atoms,
a residue which is formed by elimination of y amino groups of a saturated or unsaturated alicyclic polyamine having 6 to 25 carbon atoms or
a residue which is formed by elimination of y amino groups of an aromatic polyamine having 6 to 25 carbon atoms; any of said polyamines optionally contains further hetero atoms in its skeleton;
the radicals $Y_1$ independently of one another have one of the definitions of $X_1$;
$Z_0$ is a residue which is formed by elimination of z' amino groups and z" carboxyl groups of an unsaturated or saturated aliphatic amino carboxylic acid having 2 to 25 carbon atoms, a residue which is formed by elimination of z' amino groups and z" carboxyl groups of a saturated or unsaturated alicyclic amino carboxylic acid having 7 to 25 carbon atoms or a residue which is formed by elimination of z' amino groups and z" carboxyl groups of an aromatic amino carboxylic acid having 7 to 25 carbon atoms; any of said amino carboxylic acids optionally contains further hetero atoms in its skeleton; and
the radicals $Z_1$ and $Z_2$ independently of one another have one of the definitions given for $X_1$.

The compounds of the formula (IA), (IB) or (IC) are known and can be prepared in analogy to known methods, for example as described in WO-A-02/46,300 and WO-A-04/072,168.

The relative change of the Modulus value according to EN ISO 527 is calculated as follows:

$$\text{Modulus}_{enh.} = (\text{Modulus}_{film}/\text{Modulus}_{ref.} - 1) \times 100\%;$$

with the significances:

$\text{Modulus}_{enh}$: relative improvement (enhancement) of the Modulus as percentage;
$\text{Modulus}_{film}$: Modulus of the inventive film measured according to EN ISO 527;
$\text{Modulus}_{ref}$: Modulus value of the reference film without the nucleating agent(s) of the formula (IA), (IB) or (IC).

The reference film referred to herein has the same structure and composition as the film according to the present invention but does not contain any nucleating agent of the formula (IA), (IB) or (IC).

The total thickness of the film is preferably 10 to 250 μm, in particular 15 to 100 μm.

The film has preferably a mono-layer structure or three coextruded layers.

The melt flow rate, according to ASTM D-1238, of the polymer being present in the layer L is preferably 0.3 to 5 dg/min at 230° C. and 2.16 kg.

The concentration of the nucleating agent of the formula (IA), (IB) or (IC) in the polymer being present in the layer L is preferably 0.005 to 0.5%, in particular 0.01 to 0.2%, relative to the weight of the polymer.

The clarified film of the present invention is in particular an extruded blown film manufactured on an air cooled blown film line, and based on nucleated polypropylene as principal component. Without being bound to any theory nor limiting the scope of the current invention, it is believed that the exceptionally good processability of the films is related to the enhanced shear viscosity of the inventive polypropylene in the bubble, i.e. after blow-up of the extruded melt and before onset of solidification, respectively between film die exit and frostline.

The technique of producing blown films is well known in the art, although mainly described for polyethylene. Regular industrial blown film lines can be used to prepare the films according to the present invention. It is preferred, however, to produce blown films of high quality under high throughput conditions using equipment, which permits air cooling of the film on both sides, i.e. outside and inside the blown film bubble. Such cooling techniques have become common industrial standard over the recent years, and are nowadays widely offered by most equipment manufacturers.

The film blowing process involves continuous extrusion of a polymer through a circular die in order to form a continuous cylinder of the highly viscous polymer melt. Air is introduced through the center of the die to expand the diameter of the cylinder about 1.5 to 6 fold, simultaneously stretching the melt into longitudinal direction. By adjusting expansion and stretching of the film "bubble", the eventual size and thickness of the film can be controlled. Subsequently, the tubular film is pulled-off, collapsed on rollers, optionally cut or surface treated and finally wound onto take-up spools. There are a number of variations of such a process within the skill in the art, the contents of which is incorporated herewith by reference, for instance as described in U.S. Pat. Nos. 3,959,425; 4,820,471 (where the difference between high (referred to as "long stalk" therein) and low stalk film blowing is discussed at column 1); U.S. Pat. No. 5,284,613; W. D. Harris, et al in "Effects of Bubble Cooling on Performance and Properties of HMW-HDPE Film Resins", Polymers, Laminations & Coatings Conference Book 1990, pages 306-317; and Moore, E. P., Hanser, N.Y., 1996, pages 330-332. The term "stalk" is used to designate the neck height of a bubble of polymer being formed into a film on an air quenched blown film line.

As already described, most references to blowing polyolefin films disclose processes used for polyethylene, but these are applicable in appropriate manner to the high crystalline propylene-based polymers used in accordance with the present invention. Cooling is often advantageously modified because the art recognizes that polypropylene cools and crystallizes at a rate different from that of polyethylene, but these slight modifications are within the knowledge of the one skilled in the art. Several variations of cooling technology have been implemented by the manufacturers of blown film lines in commercially available equipment. Adjustments to the cooling parameters often produce a more stable bubble at desired output rates.

Preferably, the polymers used in accordance with the present invention are optionally blown on the low stalk film equipment (low stalk) at rates of at least about 2 kg/hour per cm of die diameter (0.18 g/s per cm of die circumference), more preferably at least about 5 kg/hour per cm of die diameter (0.44 g/s per cm of die circumference), most preferably at least about 8 kg/hour per cm of die diameter (0.71 g/s per cm of die circumference).

The formation of coextruded blown films is known in the art and applicable to the present invention. Articles illustrative of the art include Han and Shetty, "Studies on Multilayer Film Coextrusion III. The Rheology of Blown Film Coextrusion", Polymer Engineering and Science, February, (1978), vol. 18, No. 3 pages; and Morris, "Peel Strength Issues in the Blown Film Coextrusion Process", 1996 Polymers, Laminations & Coatings Conference, TAPPI Press, Atlanta, Ga. (1996), pages 571-577.

The term "coextrusion" refers to the process of extruding two or more materials through a single die with two or more orifices arranged such that the extrudates merge together into a laminar structure, preferably before chilling or quenching. Coextrusion systems for making multilayer films employ at least two extruders feeding a common die assembly. The number of extruders is dependent upon the number of different materials comprising the coextruded film. For each different material, a different extruder is advantageously used. Thus a five-layer may require up to five extruders although less may be used if two or more of the layers are made of the same material.

Coextrusion dies are used to form coextruded blown films. They have multiple mandrels that feed the different melt streams to the circular die lip. When feedblocks are employed to stack melt layers from two or more extruders, the resulting melt stream is then fed to the film die.

Coextruded blown films of the present invention can be formed into pouches, bags, containers and the like using packaging machinery within the skill in the art such as heat sealing devices using mandrels and the like. Pouches, bags and other containers made from this combination of materials provide excellent stiffness, optics and heat resistance and, furthermore, provide an excellent barrier to grease and oil and light hydrocarbons such as turpentine and the like.

Coextruded blown films of the present invention can be used as a packaging substrate alone, as a liner in multi-wall bags, or a strength ply in laminated structures such as with polyethylenes used in the food packaging industry.

In multilayer films each layer advantageously imparts for example a desired characteristic such as weatherability, heat seal, adhesion, chemical resistance, barrier layers (e.g. to water or oxygen), elasticity, shrink, durability, hand and feel, noise or noise reduction, texture, embossing, decorative elements, impermeability, stiffness, and the like. Constituents of the layers are specifically selected to achieve the desired purpose.

Adjacent layers can be directly adhered, or alternatively have an adhesive, tie or other layer between them, particularly for the purpose of improving adhesion there between. Numerous adhesives are known in the art, although not preferred for usage in coextruded multilayer films according to the present invention.

In one aspect of the present invention where stiffness, toughness, optics, and/or heat seal performance are important, coextruded multilayer films employ a high crystalline propylene based polymer in one layer and an ethylene polymer in at least one other layer. The ethylene polymer layer will improve the overall toughness of the film structure. The high crystalline propylene-based polymer will improve the overall stiffness and strength, maintain good optical clarity and may comprise a clarified copolymer or a homopolymer of the invention as described above.

Conventional clarifiers known in the art have limited thermal stability and have to be use at relatively high loadings of 1000-3000 ppm to be effective. But in particular, their limited compatibility with most polyolefin matrices, especially with polypropylene, causes severe volatility on the high specific film surface. Blooming and plate-out problems already during film blowing are so severe that the industrial use of conventional clarifiers can not really be practiced in the art, especially considering working hygiene, sublimation and deposits on colder machine parts, and affected aesthetics of the final film.

In contrast to clarifiers, conventional nucleating agents are salt-like substances, which do neither melt nor solubilize in the host polymers during processing. Although they might have beneficial effects on the mechanical properties, they cause deterioration of the optical properties (e.g. Haze or Clarity) of the final film—sometimes even opacity or milkiness of the films—and are therefore, prohibitive in usage for the manufacture of clear films.

One essential aspect of the present invention is, therefore, a novel technical route towards clarified films containing polypropylene as principal component of the film structure. The nucleating agents selected from formula (IA), (IB) or (IC) have been found to perform as excellent clarifiers for application in such films, which can be manufactured on conventional blown film lines operated with air-cooling technology.

A further embodiment of the invention comprises a process to improve the stiffness (e.g. characterized by their moduli) of such blown films without impairing their elasticity (e.g. characterized by their elongation at break). Therefore, the present invention allows to transfer the desired benefits of clarified polypropylene into highly transparent films with excellent mechanical properties at very good processibility. Even films made exclusively from clarified polypropylene can be easily blown under industrial conditions at economical significance. It should be borne in mind that such mono-layer or pseudo-monolayer films allow full re-use or recycling after film production or subsequent processing without any downgrading as to the material quality. Recycling is hardly feasible with the multi-layered structures (i.e. multi-component systems) of film based on different polymers.

In one further aspect of the invention, a three layer film structure is used with a high crystalline propylene-based polymer of the invention used for the core layer. This core layer is sandwiched between two ethylene polymer skin layers. These skin layers may be comprised of substantially linear polyethylene, homogeneously branched linear polyethylene, LDPE, LLDPE (including ethylene copolymers and terpolymers with one or more alpha-olefins), HDPE, or metallocene polyethylene (m-PE produced with a single-site catalyst) and any blends thereof.

Films according to the present invention contain at least one layer of polypropylene as inner layer or as skin layer of the coextruded films. As well known and practiced in the art, combinations with further polymers are widely applied to adjust specific properties of the films and the articles made thereof. For example, coextruded layers of EVOH, PVDC (e.g. Saran™), polyamide (e.g. Nylon™) or polyester (e.g. Mylar™) are frequently used to reduce the gas permeability for oxygen, carbondioxide or ethyleneoxide; coextruded layers of ethylene homo- and copolymers (e.g. ULDPE, VLDPE, LDPE, LLDPE, MDPE, HDPE, m-PE) improve puncture resistance or toughness, create a soft-touch feeling or modify heat-sealing or tacking properties.

These functional layers can be surprisingly thin comprising only 20% or even less of the total film composition. Their specific functionalities, such as the aforementioned barrier properties, have typically more significance for the final film properties than their individual thickness. A multitude of different film-forming polymers can be combined in such multilayer films by either direct coextrusion or by using adhesives to further "cement" the individual layers. The inventive films, however, are preferable made without such adhesives.

In addition to the nucleator/clarifier additive described earlier, additives typically used with propylene-based polymers may be included in the high crystalline propylene-based polymers of the invention. Films made of compositions according to the invention advantageously have greater stiffness, strength and high-temperature resistance.

In accordance with the disclosure above, the present invention relates to the following preferred embodiments:

E-1) An extruded air cooled blown film which is composed of 20 to 100% by weight, relative to its total weight, of a polypropylene homopolymer or copolymer.

E-2) An extruded air cooled blown film wherein layer L contains a polypropylene homopolymer, random copolymer, alternating or segmented copolymer, a block copolymer or a blend of polypropylene with another synthetic polymer.

E-3) An extruded air cooled blown film wherein layer L contains a propylene copolymer with ethylene at an ethylene content of 0.5 to 15% by weight, relative to the total weight of the propylene copolymer.

E-4) An extruded air cooled blown film wherein the polypropylene homopolymer or copolymer has a melt flow rate of 0.3 to 5 dg/min at 230° C. and 2.16 kg according to ASTM D1238.

E-5) An extruded air cooled blown film wherein the film structure contains at least one coextruded layer of low-, linear-low- or high-density polyethylene (LDPE, LLDPE, HDPE) or metallocene polyethylene (m-PE produced with a single-site catalyst), adjacent to the layer of polypropylene.

E-6) An extruded air cooled blown film consisting of 3 coextruded layers, the layer L is the inner layer and two layers S1 and S2 are the outer layers, said skin layers S1 and S2 contain at least 50% of low-, linear-low- or high-density polyethylene (LDPE, LLDPE, HDPE) or metallocene polyethylene (m-PE produced with a single-site catalyst) or any mixtures thereof.

E-7) An extruded air cooled blown film consisting of one or more layers of polypropylene homopolymer or copolymer comprising at least 50% of the total weight of the film, of which at least one layer consists of clarified polypropylene.

E-8) An extruded air cooled blown film containing one or two layers of polypropylene homopolymer or copolymer as skin layers on one or both outer sides of the film, i.e. forming one or two surface layers, of which at least one layer consists of clarified polypropylene.

E-9) An extruded air cooled blown film consisting of two or three coextruded layers, the layer L is the base layer and one or two layers S1 and S2 are the outer layers, wherein the ratio of the layer thicknesses L/(S1+S2) is from 20/1 to 1/2.5, preferably from 10/1 to 1/1, in particular from 6/1 to 2.5/1.

E-10) An extruded air cooled blown film wherein one or more layers contain ethylene vinyl alcohol copolymer (EVOH), ethylene vinyl acetate copolymer (EVA), maleic anhydride grafted polypropylene or polyethylene, copolymers of acrylic-acid esters with propylene or ethylene, acrylic acid copolymers with propylene or ethylene, polyvinylidene chloride (PVDC), polyamide or polyester.

E-11) An extruded air cooled blown film consisting of one core layer of clarified polypropylene homopolymer or copolymer and less than 50% of one or more layers containing EVOH, EVA, maleic anhydride grafted polypropylene or polyethylene, copolymers of acrylic-acid esters with propylene or ethylene, acrylic acid copolymers with propylene or ethylene, PVDC, polyamide or polyester, relative to the total weight of the film.

E-12) An extruded air cooled blown film which contains additionally one or more adhesive layers sandwiched between the further layers comprising the total film structure. Useful adhesives are known in the art, although not preferred for usage in coextruded multilayer films according to the invention.

E-13) An extruded air cooled blown film having a Modulus according to EN ISO 527 enhanced by at least 10 or 15% versus a reference film without the nucleating agent(s) of the formula (IA), (IB) or (IC). Said film Modulus is in particular enhanced by 10 to 200% or 15 to 80%, relative to the reference film. The enhancement may be in longitudinal and/or transversal direction.

E-14) An extruded air cooled blown film having a Modulus according to EN ISO 527 enhanced in longitudinal direction by at least 10% versus a reference film without a nucleating agent of the formula (IA), (IB) or (IC).

E-15) An extruded air cooled blown film having a Modulus according to EN ISO 527 enhanced in transversal direction by at least 10% versus a reference film without a nucleating agent of the formula (IA), (IB) or (IC).

E-16) An extruded air cooled blown film having a Haze value (ASTM D-1003) reduced by at least 10% or at least 15%, relative to a reference film without the nucleating agent(s) of the formula (IA), (IB) or (IC). Said Haze value is in particular reduced by 10 to 90% or 15 to 70%, relative to the reference film.

The aforementioned relative change of the Haze is calculated as follows:

$$\text{Haze}_{red.} = (\text{Haze}_{film}/\text{Haze}_{ref.} - 1) \times 100\%;$$ wherein the significances are:

$\text{Haze}_{red}$: relative improvement (reduction) of Haze expressed as percentage;

$\text{Haze}_{film}$: Haze value of the inventive film measured according to ASTM D-1003;

$\text{Haze}_{ref}$: Haze value of the reference film without the nucleating agent(s) of the formula (IA), (IB) or (IC).

E-17) An extruded air cooled blown film having a Clarity value (ASTM D-1746) enhanced by at least 0.5% or at least 1.5%, relative to a reference film without the nucleating agent(s) of formula (IA), (IB) or (IC). Said Clarity value is in particular enhanced by 0.5 to 50% or 1.5 to 25%, relative to the reference film.

The aforementioned relative change of the Clarity is calculated as follows:

$$\text{Clarity}_{enh.} = (\text{Clarity}_{film}/\text{Clarity}_{ref.} - 1) \times 100\%;$$ wherein the significances are:

$\text{Clarity}_{enh}$: relative improvement (enhancement) of Clarity expressed as percentage;

$\text{Clarity}_{film}$: Clarity value of the inventive film measured according to ASTM D-1746;

$\text{Clarity}_{ref}$: Clarity value of the reference film without the inventive nucleating agent.

E-18) An extruded air cooled blown film having a Haze value according to ASTM D-1003 reduced by at least 10% relative to a reference film without a nucleating agent of the formula (IA), (IB) or (IC), and a Clarity value according to ASTM D-1746 enhanced by at least 0.5% relative to a reference film without a nucleating agent of the formula (IA), (IB) or (IC).

E-19) An extruded air cooled blown film which additionally contains in one or more layers at least one additive selected from the group consisting of 1) anti-agglomerants, preferably 0.005 to 0.2%, in particular 0.01 to 0.1% by weight, like for example esters of polyols with fatty acids, or salts of fatty acids, or alpha-tocopherol;

2) antioxidants, preferably 0.01 to 0.5% by weight, like for example primary phenolic and lactone-based antioxidants or secondary antioxidants containing phosphorous or sulfur;

3) antistatic agents, preferably 0.1 to 1.5% by weight, like for example amides of fatty acids, ethoxylated amides or ethoxylated amines, sulfate-, sulfonate-, phosphate- or phosphonate esters with long-chain alcohols, quarterny long-chain alkyl ammonium compounds;

4) slip- and anti-blocking agents, preferably 0.2 to 1% by weight, like for example compounds based on amides of saturated, preferably unsaturated long-chain fatty acids, inorganic oxides such as silica, zeolites, alumosilicates; and 5) anti-fogging agents, preferably 0.5 to 5% by weight, like for example compounds based on ethoxylated long-chain aliphatic or aromatic alcohols, esters of saturated or unsaturated long-chain fatty acids with glycerol, polyglycerol or sorbitan; and 6) light stabilizers, preferably 0.1 to 2% by weight, like for example sterically hindered amines or UV absorbers or any combination thereof.

("% by weight" means "relative to the weight of the polymer forming the individual layer".)

E-20) An extruded air cooled blown film wherein the layer L additionally contains one or more anti-agglomerants.

A more detailed description of further additives which may be present in the polymers forming the individual layer(s) is listed below. These additives may be present in the polymer in an amount of 0.001 to 10% by weight, relative to the weight of the polymer.

1. Antioxidants 1.1. Alkylated monophenols, for example 2,6-di-tert-butyl-4-methylphenol, 2-tert-butyl-4,6-di-methylphenol, 2,6-di-tert-butyl-4-ethylphenol, 2,6-di-tert-butyl-4-n-butylphenol, 2,6-di-tert-bu-tyl-4-isobutylphenol, 2,6-dicyclopentyl-4-methylphenol, 2-(α-methylcyclohexyl)-4,6-dimethyl-phenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxy-phenol, 2,5-di-tert-butylhydroquinone, 2,5-di-tert-amylhydroquinone, 2,6-diphenyl-4-octade-cyloxyphenol, 2,6-di-tert-butylhydroquinone, 2,5-di-tert-butyl-4-hydroxyanisole, 3,5-di-tert-bu-tyl-4-hydroxyanisole, 3,5-d i-tert-butyl-4-hydroxyphenyl stearate, bis(3,5-d i-tert-butyl-4-hydroxyphenyl) adipate.

1.4. Tocopherols, for example α-tocopherol, β-tocopherol, γ-tocopherol, δ-tocopherol and mixtures thereof (vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl)-disulfide.

1.6. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)-phenol], 2,2'-methylenebis(4-methyl-6-cyclohexylphenol), 2,2'-methylenebis(6-nonyl-4- methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl)butyrate], bis(3-tert-butyl-4-hydroxy-5-methyl-phenyl)dicyclopenta-diene, bis[2-(3'-tert-butyl-2'-hydroxy-5'-methylbenzyl)-6-tert-butyl-4-methylphenyl]terephtha-late, 1,1-bis-(3,5-dimethyl-2-hydroxyphenyl)butane, 2,2-bis(3,5-di-tert-butyl-4-hydroxyphe-nyl)propane, 2,2-bis(5-tert-butyl-4-hydroxy2-methylphenyl)-4-n-dodecylmercaptobutane, 1,1,5,5-tetra-(5-tert-butyl-4-hydroxy-2-methylphenyl)pentane.

1.7. O-, N- and S-benzyl compounds, for example 3,5,3',5'-tetra-tert-butyl-4,4'-dihydroxydi-benzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxy-benzyl)sulfide, isooctyl-3,5-di-tert-butyl-4-hydroxybenzylmercaptoacetate.

1.8. Hydroxybenzylated malonates, for example dioctadecyl-2,2-bis(3,5-di-tert-butyl-2-hy-droxybenzyl)malonate, di-octadecyl-2-(3-tert-butyl-4-hydroxy-5-methylbenzyl)malonate, di-dodecylmercaptoethyl-2,2-bis (3,5-di-tert-butyl-4-hydroxybenzyl)malonate, bis[4-(1,1,3,3-te-tramethylbutyl)phenyl]-2,2-bis(3,5-di-tert-butyl-4-hydroxybenzyl)malonate.

1.9. Aromatic hydroxybenzyl compounds, for example 1,3,5-tris(3,5-di-tert-butyl-4-hydroxy-benzyl)-2,4,6-trimethylbenzene, 1,4-bis(3,5-di-tert-butyl-4-hydroxybenzyl)-2,3,5,6-tetrame-thylbenzene, 2,4,6-tris(3,5-d i-tert-butyl-4-hydroxybenzyl)phenol.

1.10. Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris-(3,5-di-tert-butyl-4-hydroxyphenoxy)-1,2,3-triazine, 1,3,5-tris(3,5-d i-tert-butyl-4-hydroxyben-zyl)isocyanurate, 1,3,5-tris(4-tert-butyl-3-hydroxy-2,6-dimethylbenzyl)isocyanurate, 2,4,6-tris-(3,5-di-tert-butyl-4-hydroxyphenylethyl)-1,3,5-triazine, 1,3,5-tris(3,5-di-tert-butyl-4-hydroxy-phenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hy-droxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis-(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane; 3,9-bis[2-{3-(3-tert-butyl-4-hydroxy-5-methylphenyl)propionyloxy}-1,1-dimethylethyl]-2,4,8,10-tetraoxaspiro[5.5]-undecane.

1.15. Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N, N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N, N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl)propionic acid e.g. N,N'-bis(3,5-di-tert-butyl-4-hydroxyphenylpropionyl)hexamethylenediamide, N,N'-bis(3,5-di-tert-butyl-4-hydroxy-phenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard®XL-1, supplied by Uniroyal).

1.18. Ascorbic acid (vitamin C)

1.19. Aminic antioxidants, for example N,N'-di-isopropyl-p-phenylenediamine, N,N'-di-sec-bu-tyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicy-clohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phe-nyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenyl-amine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butyl-aminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylamino-methylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenyl-amino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenyl-amines, a mixture of mono- and dialkylated nonyldiphenylamines, a mixture of mono- and dialkylated dodecyldiphenylamines, a mixture of mono- and dialkylated isopropyl/isohexyl-diphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octyl-phenothiazines, a mixture of mono- and dialkylated tert-octyl-phenothiazines, N-allylphenothiazine, N,N,N',N'-tetraphenyl-1,4-diaminobut-2-ene.

2. UV Absorbers and Light Stabilizers 2.1. 2-(2'-Hydroxyphenyl)benzotriazoles, for example 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphe-nyl)benzotriazole, 2-(2'-hydroxy-g-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis-(α,α-dimethylbenzyl)-2'-hydroxyphenyl)benzotriazole, 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyl-oxy)-carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-meth-oxycarbonylethyl)phenyl)benzotriazole, 2-(3'-tert-butyl-2'-hydroxy-5'-(2-octyloxycarbonyl-ethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)phenylbenzotriazole, 2,2'-methylene-bis[4-(1,1,3,3-tetramethylbutyl)-6-benzotriazole-2-ylphenol]; the transesterification product of 2-[3'-tert-bu-tyl-5'-(2-methoxycarbonylethyl)-2'-hydroxyphenyl]-2H-benzotriazole with polyethylene glycol 300; [R—CH$_2$CH$_2$—COO—CH$_2$CH$_2$—]$_2$, where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)-phenyl]-benzotriazole; 2-[2'-hydroxy-3'-(1,1,3,3-tetramethylbutyl)-5'-(α,α-dimethylbenzyl)-phenyl]benzotriazole.

2.2. 2-Hydroxybenzophenones, for example the 4-hydroxy, 4-methoxy, 4-octyloxy, 4-decyl-oxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, for example 4-tert-butylphenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-6-methyl-p-methoxycinnamate, methyl α-carbomethoxy-p-methoxy-cinnamate, N-(β-carbomethoxy-β-cyanovinyl)-2-methylindoline, neopentyl tetra(α-cyano-β,β-diphenylacrylate.

2.5. Nickel compounds, for example nickel complexes of 2,2'-thio-bis[4-(1,1,3,3-tetramethyl-butyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenylundecylketoxime, nickel complexes of 1-phenyl-4-lauroyl-5-hydroxypyrazole, with or without additional ligands.

2.6. Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butanetetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensate of N,N'-bis(2,2,6,6-tetramethyl-4-piperidyl)hexamethylenediamine and 4-cyclohexylamino-2,6-dichloro-1,3,5-triazine, a condensate of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); a condensate of 1,6-hexanediamine and 2,4,6-trichloro-1,3,5-triazine as well as N,N-dibutylamine and 4-butylamino-2,2,6,6-tetramethylpiperidine (CAS Reg. No. [192268-64-7]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxo-spiro[4,5]decane, a reaction product of 7,7,9,9-tetramethyl-2-cycloundecyl- 1-oxa-3,8-diaza-4-oxospiro-[4,5]decane and epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl) hexamethylenediamine, a diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, a reaction product of maleic acid anhydride-α-olefin copolymer with 2,2,6,6-tetramethyl-4-aminopiperidine or 1,2,2,6,6-pentamethyl-4-aminopiperidine, 2,4-bis[N-(1-cyclohexyloxy-2,2,6,6-tetramethylpiperidine-4-yl)-N-butylamino]-6-(2-hydroxyethyl)amino-1,3,5-triazine, 1-(2-hydroxy-2-methylpropoxy)-4-octadecanoyloxy-2,2,6,6-tetramethylpiperidine, 5-(2-ethylhexanoyl)-oxymethyl-3,3,5-trimethyl-2-morpholinone, Sanduvor (Clariant; CAS Reg. No. 106917-31-1], 5-(2-ethylhexanoyl)oxymethyl-3,3,5-trimethyl-2-morpholinone, the reaction product of 2,4-bis-[(1-cyclohexyloxy-2,2,6,6-piperidine-4-yl)butylamino]-6-chloro-s-triazine with N,N'-bis(3-aminopropyl)ethylenediamine), 1,3,5-tris(N-cyclohexyl-N-(2,2,6,6-tetramethylpiperazine-3-one-4-yl)amino)-s-triazine, 1,3,5-tris(N-cyclohexyl-N-(1,2,2,6,6-pentamethylpiperazine-3-one-4-yl)-amino)-s-triazine.

2.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyl-oxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy) phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine, 2,4-bis(4-[2-ethylhexyloxy]-2-hydroxyphenyl)-6-(4-methoxyphenyl)-1,3,5-triazine.

3. Metal deactivators, for example N,N'-diphenyloxamide, N-salicylal-N'-salicyloyl hydrazine, N,N'-bis(salicyloyl) hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

4. Phosphites and phosphonites, for example triphenyl phosphite, diphenylalkyl phosphites, phenyldialkyl phosphites, tris(nonylphenyl) phosphite, trilauryl phosphite, trioctadecyl phosphite, distearylpentaerythritol diphosphite, tris(2,4-di-tert-butylphenyl) phosphite, diisodecyl pentaerythritol diphosphite, bis(2,4-di-tert-butylphenyl)pentaerythritol diphosphite, bis(2,4-di-cumylphenyl)pentaerythritol diphosphite, bis(2,6-di-tert-butyl-4-methylphenyl)pentaerythritol diphosphite, diisodecyloxypentaerythritol diphosphite, bis(2,4-d i-tert-butyl-6-methylphenyl)-pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12 H-dibenz[d,g]-1,3,2-dioxaphosphocin, bis(2,4-di-tert-butyl-6-methylphenyl)methyl phosphite, bis(2,4-di-tert-butyl-6-methylphenyl)ethyl phosphite, 6-fluoro-2,4,8,10-tetra-tert-butyl-12-methyl-dibenz[d,g]-1,3,2-dioxaphosphocin, 2,2',2''-nitrilo-[triethyltris(3,3',5,5'-tetra-tert-butyl-1,1'-biphenyl-2,2'-diyl) phosphite], 2-ethylhexyl(3,3',5,5'-te-tra-tert-butyl-1,1'-biphenyl-2,2'-diyl)phosphite, 5-butyl-5-ethyl-2-(2,4,6-tri-tert-butylphenoxy)-1,3,2-dioxaphosphirane.

The following phosphites are especially preferred:
Tris(2,4-di-tert-butylphenyl) phosphite (Irgafos®168, Ciba Specialty Chemicals Inc.), tris(nonylphenyl) phosphite,

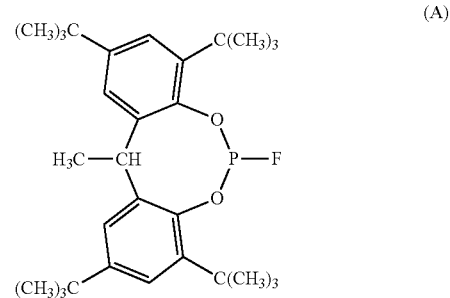

(A)

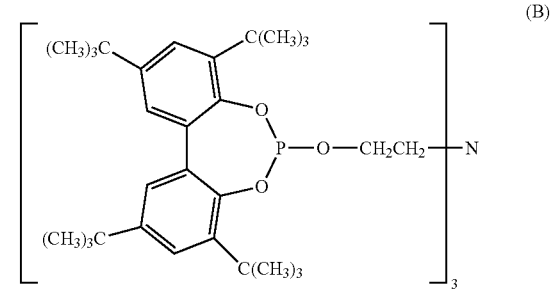

(B)

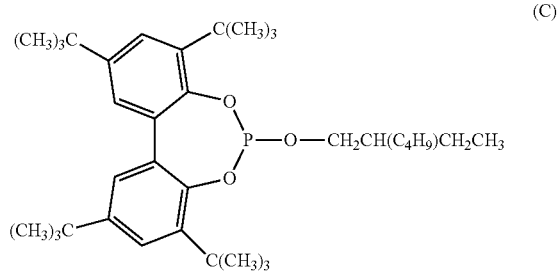

(C)

-continued

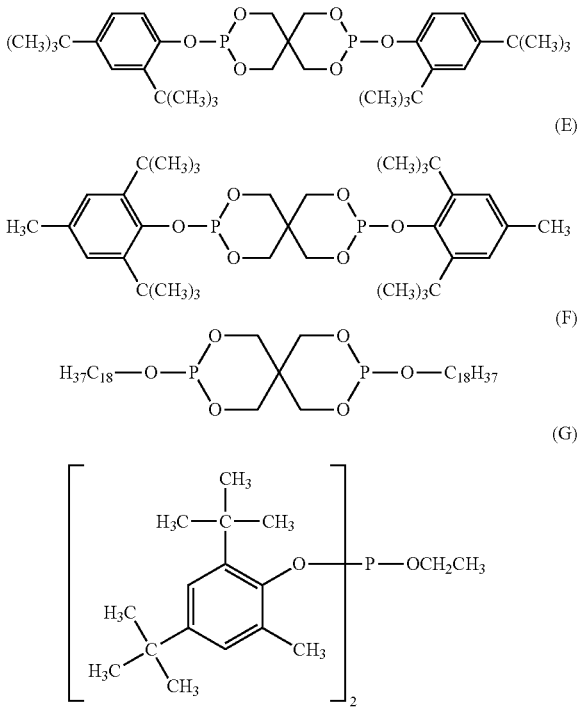

5. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.
6. Nitrones, for example, N-benzyl-alpha-phenylnitrone, N-ethyl-alpha-methylnitrone, N-octyl-alpha-heptylnitrone, N-lauryl-alpha-undecylnitrone, N-tetradecyl-alpha-tridecylnnitrone, N-hexadecyl-alpha-pentadecylnitrone, N-octadecyl-alpha-heptadecylnitrone, N-hexadecyl-alpha-heptadecylnitrone, N-octadecyl-alpha-pentadecylnitrone, N-heptadecyl-alpha-heptadecylnitrone, N-octadecyl-alpha-hexadecylnitrone, nitrone derived from N,N-dialkylhydroxylamine derived from hydrogenated tallow amine.
7. Thiosynergists, for example dilauryl thiodipropionate, dimistryl thiodipropionate, distearyl thiodipropionate or distearyl disulfide.
8. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.
9. Polyamide stabilizers, for example copper salts in combination with iodides and/or phosphorus compounds and salts of divalent manganese.
10. Basic co-stabilizers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate and potassium palmitate, antimony pyrocatecholate or zinc pyrocatecholate.
11. Nucleating agents, for example inorganic substances, such as talcum, metal oxides, such as titanium dioxide or magnesium oxide, phosphates, carbonates or sulfates of, preferably, alkaline earth metals; organic compounds, such as mono- or polycarboxylic acids and the salts thereof, e.g. 4-tert-butylbenzoic acid, adipic acid, diphenylacetic acid, sodium succinate or sodium benzoate; polymeric compounds, such as polyvinylcyclohexane or any copolymers thereof and ionic copolymers (ionomers). Especially preferred are 1,3:2,4-bis(3',4'-dimethylbenzylidene)sorbitol, 1,3:2,4-di(paramethyldibenzylidene) sorbitol, and 1,3:2,4-di(benzylidene)sorbitol.
12. Fillers and reinforcing agents, for example calcium carbonate, silicates, glass fibres, glass beads, asbestos, talc, kaolin, mica, barium sulfate, metal oxides and hydroxides, carbon black, graphite, wood flour and flours or fibers of other natural products, synthetic fibers.
13. Other additives, for example plasticisers, lubricants, emulsifiers, pigments, rheology additives, catalysts, flow-control agents, optical brighteners, flameproofing agents, antistatic agents and blowing agents. For obvious reasons, the optional usage of antistatic agents must be kept at reasonable levels to avoid adverse effects on the charge storage properties according to the invention.
14. Benzofuranones and indolinones, for example those disclosed in U.S. Pat. Nos. 4,325,863; 4,338,244; 5,175,312; 5,216,052; 5,252,643; DE-A-4316611; DE-A-4316622; DE-A-4316876; EP-A-0589839, EP-A-0591102; EP-A-1291384 or 3-[4-(2-acetoxyethoxy)phenyl]-5,7-di-tert-butylbenzofuran-2-one, 5,7-d i-tert-butyl-3-[4-(2-stearoyloxy-ethoxy)phenyl]benzofuran-2-one, 3,3'-bis[5,7-d i-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butylbenzofuran-2-one, 3-(3,5-dimethyl-4-pivaloyloxyphenyl)-5,7-di-tert-butylbenzofuran-2-one, 3-(3,4-dimethylphenyl)-5,7-di-tert-butylbenzofuran-2-one, 3-(2,3-dimethylphenyl)-5,7-di-tert-butylbenzofuran-2-one, 3-(2-acetyl-5-isooctylphenyl)-5-isooctyl-benzofuran-2-one.

A More Detailed Description of the Different Radicals of the Nucleating Agents of the Formula (IA), (IB) or (IC) is Given Below.

Examples of a saturated or unsaturated aliphatic polycarboxylic acid having 3 to 25, preferably 3 to 16, in particular 4 to 12, carbon atoms and x carboxyl groups and optionally containing further hetero atoms in its skeleton are malonic acid, diphenylmalonic acid, succinic acid, phenylsuccinic acid, diphenylsuccinic acid, glutaric acid, 3,3-dimethylglutaric acid, adipic acid, pimelic acid, suberic acid, azelaic acid, sebacic acid, 1,12-dodecanedioic acid, 1,14-tetradecanedioic acid, 1,18-octadecanedioic acid, citric acid, methanetricarboxylic acid, tricarballylic acid, propenetricarboxylic acid, pentanetricarboxylic acid, ethanetetracarboxylic acid, propanetetracarboxylic acid, pentanetetracarboxylic acid, butanetetracarboxylic acid (particularly 1,2,3,4-butanetetracarboxylic acid), dodecanetetracarboxylic acid, pentanepentacarboxylic acid, tetradecanehexacarboxylic acid, ethylenediaminetetraacetic acid, nitrilotriacetic acid, ethyleneglycolbis[beta-aminoethylether]N,N,N',N'-tetraacetic acid, diethylenetriaminepentaacetic acid, N-hydroxyethylethylenediamine-N,N',N'-triacetic acid, 1,3-diaminopropane-2-ol-N,N,N',N'-tetraacetic acid, 1,2-diaminopropane-N,N,N',N'-tetraacetic acid, triethylenetetraminehexaacetic acid, nitrilotripropionic acid, 1,6-hexanediaminetetraacetic acid, N-(2-carboxyethyl)iminodiacetic acid and the like.

Examples of a saturated or unsaturated alicyclic polycarboxylic acid having 7 to 25, preferably 8 to 16, carbon atoms and x carboxyl groups and optionally containing further hetero atoms in its skeleton are 1,2-cyclohexane dicarboxylic acid, 1,4-cyclohexanedicarboxylic acid, 1,4-cyclohexanediacetic acid, cyclohexanetricarboxylic acid, cyclobutanetetracarboxylic acid, cyclopentanetetracarboxylic acid, cyclohexanetetracarboxylic acid, tetrahydrofurantetracarboxylic acid, 5-(succinic acid)-3-methyl-3-cylohexene-1,2-dicarboxylic acid, bicyclo[2,2,2]octa-7-ene-2,3,5,6-tetracarboxylic acid, cyclohexanehexacarboxylic acid, 5,6,9,10-tetracarboxytricyclo[6.2.2.0.sup.2,7]dodeca-2,11-diene which may have a lower alkyl group as a substituent (such as a methyl group at the 3-, 8-11- or 12-position), 1,2-cyclohexanediaminetetraacetic acid, 2,3,5-tricarboxycyclopentylacetic acid, 6-methyl-4-cyclohexene-1,2,3-tricarboxylic acid, 3,5,6-tricarboxynorbornene-2-acetic acid, thiobis(norbornene-2,3-dicarboxylic acid), bicyclo[4.2.0]octane-3,4,7,8-tetracarboxylic acid, 1,1'-bicyclopropane-2,2',3,3'-tetracarboxylic acid, 1,2-bis(2,3-dimethyl-2,3-dicarboxycyclobutyl)ethane, pyrazine-2,3,5,6-tetracarboxylic acid, tricyclo[4.2.2.0.sup.2,5]decane-9-ene-3,4,7,8-tetracarboxylic acid, 3,4-dicarboxy-1,2,3,4-tetrahydro-1-naphthalenesuccinic acid which may have a lower alkyl group as a substituent (such as a methyl group at the 1-, 5-, 6- or 7-position), 2,3,4,5,6,7,12,13-octahydrophenanthrene-3,4,5,6-tetracarboxylic acid and the like.

Examples of an aromatic polycarboxylic acid having 8 to 25, preferably 8 to 22, in particular 8 to 17, carbon atoms and x carboxyl groups and optionally containing further hetero atoms in its skeleton are p-phenylenediacetic acid, p-phenylenediethanoic acid, phthalic acid, 4-tert-butylphthalic acid, isophthalic acid, 5-tert-butylisophthalic acid, terephthalic acid, 1,8-naphthalenedicarboxylic acid, 1,4-naphthalenedicarboxylic acid, 2,6-naphthalenedicarboxylic acid, 2,7-naphthalenedicarboxylic acid, diphenic acid, 3,3'-biphenyldicarboxylic acid, 4,4'-biphenyldicarboxylic acid, 4,4'-binaphthyldicarboxylic acid, bis(3-carboxyphenyl)methane, bis(4-carboxyphenyl)methane, 2,2-bis(3-carboxyphenyl)propane, 2,2-bis(4-carboxyphenyl)propane, 3,3'-sulfonyldibenzoic acid, 4,4,-sulfonyldibenzoic acid, 3,3'-oxydibenzoic acid, 4,4'-oxydibenzoic acid, 3,3'-carbonyldibenzoic acid, 4,4'-carbonyldibenzoic acid, 3,3'-thiodibenzoic acid, 4,4'-thiodibenzoic acid, 4,4'-(p-phenylenedioxy)dibenzoic acid, 4,4'-isophthaloyldibenzoic acid, 4,4'-terephthaloyldibenzoic acid, dithiosalicylic acid, benzenetricarboxylic acid such as trimesic or trimellitic acid, benzenetetracarboxylic acid, benzophenonetetracarboxylic acid, biphenyltetracarboxylic acid, diphenylethertetracarboxylic acid, diphenylsulfonetetracarboxylic acid, diphenylmethanetetracarboxylic acid, perylenetetracarboxylic acid, naphthalenetetracarboxylic acid, 4,4'-dinaphthalic acid, benzidine-3,3'-dicarboxyl-N,N'-tetraacetic acid, diphenylpropanetetracarboxylic acid, anthracenetetracarboxylic acid, phthalocyaninetetracarboxylic acid, ethyleneglycoltrimellitic acid diester, benzenehexacarboxylic acid, glycerine-trimellitic acid triester and so on.

A preferred hetero-atom contained in said aromatic polycarboxylic acid is nitrogen, in particular one to three nitrogen atoms. Most preferred are polycarboxylic acids of pyridine and sym-triazine.

Examples of linear or branched alkyl having up to 20 carbon atoms and being optionally substituted by one or more hydroxy, amino and/or nitro groups are ethyl, n-propyl, 1-methylethyl, n-butyl, 2-methylpropyl, 1-methylpropyl, tert-butyl, pentyl, 1-methylbutyl, 2-methylbutyl, 3-methylbutyl, 1,1-dimethylpropyl, 1-ethylpropyl, tert-butylmethyl, hexyl, 1-methylpentyl, heptyl, isoheptyl, 1-ethylhexyl, 2-ethylpentyl, 1-propylbutyl, 1,1,3,3-tetramethylbutyl, octyl, nonyl, isononyl, neononyl, 2,4,4-trimethylpentyl, undecyl, tridecyl, pentadecyl, heptadecyl, hydroxymethyl, 1-hydroxyethyl and 1-aminoethyl. Branched $C_3$-$C_{10}$alkyl is particularly preferred. One of the preferred meanings of the radicals $X_1$, $Y_1$, $Z_1$ and $Z_2$ is branched $C_3$-$C_{10}$alkyl with a quaternary C atom in position 1, in particular —C(CH$_3$)$_2$—H or —C(CH$_3$)$_2$—(C$_1$-C$_7$alkyl).

Examples of $C_2$-$C_{20}$alkyl interrupted by oxygen or sulfur are t-butoxymethyl, t-butoxyethyl, t-butoxypropyl, t-butoxybutyl, (H$_3$C)$_3$C—S—CH$_2$—, (H$_3$C)$_3$C—S—C$_2$H$_4$—, (H$_3$C)$_3$C—S—C$_3$H$_6$— and (H$_3$C)$_3$C—S—C$_4$H$_8$—.

Examples of $C_1$-$C_8$alkoxy are methoxy, ethoxy, propoxy, butoxy, pentyloxy, hexyloxy, heptyloxy and octyloxy. Methoxy is particularly preferred.

Examples of $C_2$-$C_{20}$alkenyl unsubstituted or substituted by one or more hydroxy, amino and/or nitro groups are 9-decenyl, 8-heptadecenyl, 11-hydroxy-8-heptadecenyl and 11-amino-8-heptadecenyl.

Examples of $C_3$-$C_{12}$cycloalkyl unsubstituted or substituted by one or more $C_1$-$C_{20}$alkyl, e.g. 1, 2, 3 or 4 $C_1$-$C_4$alkyl, are cyclopropyl, 3-methylcyclopropyl, 2,2,3,3-tetramethylcyclopropyl, cyclobutyl, cyclopentyl, cyclohexyl, 1-methylcyclohexyl, 2-methylcyclohexyl, 3-methylcyclohexyl, 4-methylcyclohexyl, 4-tert-butylcyclohexyl and cycloheptyl.

Examples of ($C_3$-$C_{12}$cycloalkyl)-$C_1$-$C_{10}$alkyl unsubstituted or substituted by one or more $C_1$-$C_{20}$alkyl, e.g. 1, 2 or 3 $C_1$-$C_4$alkyl, are cyclopentylmethyl, 2-cyclopentylethyl, cyclohexylmethyl, 2-cycohexylethyl, 3-cyclohexylpropyl, 4-cyclohexylbutyl and (4-methylcyclohexyl)methyl.

An example of bis[$C_3$-$C_{12}$cycloalkyl]-$C_1$-$C_{10}$alkyl unsubstituted or substituted by one or more $C_1$-$C_{20}$alkyl, e.g. 1, 2 or 3 $C_1$-$C_4$alkyl, is dicyclohexylmethyl.

Examples of a bicyclic or tricyclic hydrocarbon radical with 5 to 20 carbon atoms unsubstituted or substituted by one or more $C_1$-$C_{20}$alkyl, e.g. 1, 2 or 3 $C_1$-$C_4$alkyl, are

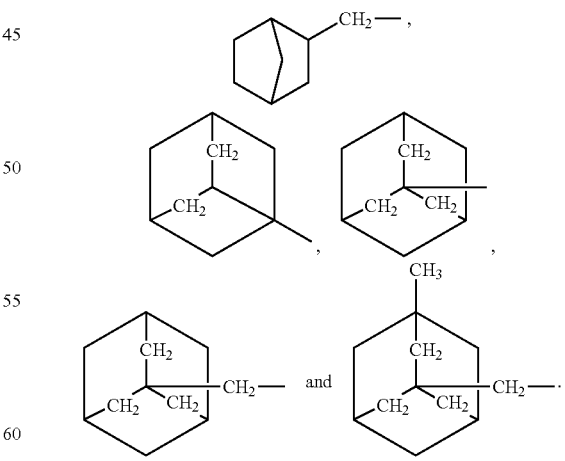

Examples of phenyl unsubstituted or substituted by one or more radicals selected from $C_1$-$C_{20}$alkyl, $C_1$-$C_{20}$alkoxy, $C_1$-$C_{20}$alkylamino, di($C_1$-$C_{20}$alkyl)amino, amino, hydroxy and nitro, preferably $C_1$-$C_4$alkyl, $C_1$-$C_4$alkoxy, $C_1$-$C_4$alkylamino, di($C_1$-$C_4$alkyl)amino, hydroxy and nitro, are phenyl, 3-methylphenyl, 3-methoxyphenyl, 4-methylphenyl, 4-ethylphenyl, 4-propylphenyl, 4-isopropylphenyl, 4-tert-butylphenyl, 4-isopropoxyphenyl, 2,3-dimethoxyphenyl, 2-nitrophenyl, 3-methyl-6-nitrophenyl, 4-dimethylaminophenyl, 2,3-dimethylphenyl, 2,6-dimethylphenyl, 2,4-dimethylphenyl, 3,4-dimethylphenyl, 3,5-dimethylphenyl, 3,5-di-tert-butylphenyl, 2,4,6-trimethylphenyl and 3,5-di-tert-butyl-4-hydroxyphenyl.

Examples of phenyl-$C_1$-$C_{20}$alkyl unsubstituted or substituted by one or more radicals selected from $C_1$-$C_{20}$alkyl, $C_3$-$C_{12}$cycloalkyl, phenyl, $C_1$-$C_{20}$alkoxy, amino, hydroxy and nitro, preferably $C_1$-$C_4$alkyl, $C_3$-$C_6$cycloalkyl, phenyl, $C_1$-$C_4$alkoxy and hydroxy, are benzyl, α-cyclohexylbenzyl, diphenylmethyl, 1-phenylethyl, α-hydroxybenzyl, 2-phenylethyl, 2-phenylpropyl, 3-phenylpropyl, 3-methylbenzyl, 3,4-dimethoxybenzyl and 2-(3,4-dimethoxyphenyl)ethyl.

An example of phenylethenyl unsubstituted or substituted by one or more $C_1$-$C_{20}$alkyl, e.g. 1, 2 or 3 $C_1$-$C_4$alkyl, is 2-(4-methylphenyl)ethenyl.

An example of biphenyl-($C_1$-$C_{10}$alkyl) unsubstituted or substituted by one or more $C_1$-$C_{20}$alkyl, e.g. 1, 2 or 3 $C_1$-$C_4$alkyl, is 4-biphenylmethyl.

Examples of naphthyl unsubstituted or substituted by one or more $C_1$-$C_{20}$alkyl, e.g. 1, 2 or 3 $C_1$-$C_4$alkyl, are 1-naphthyl and 2-naphthyl.

Examples of naphthyl-$C_1$-$C_{20}$alkyl unsubstituted or substituted by one or more $C_1$-$C_{20}$alkyl, e.g. 1, 2 or 3 $C_1$-$C_4$alkyl, are 1-naphthylmethyl and 2-naphthylmethyl.

An example of naphthoxymethyl unsubstituted or substituted by one or more $C_1$-$C_{20}$alkyl, e.g. 1, 2 or 3 $C_1$-$C_4$alkyl, is 1-naphthoxymethyl.

An example of biphenylenyl, fluorenyl or anthryl is 2-biphenylenyl, 9-fluorenyl, 1-fluorenyl or 9-anthryl, respectively.

Examples of a 5- to 6-membered heterocyclic radical unsubstituted or substituted by one or more $C_1$-$C_{20}$alky, e.g. 1, 2 or 3 $C_1$-$C_4$alkyl, are 3-pyridinyl, 4-pyridinyl, 2-hydroxypyridin-3-yl, 3-quinolinyl, 4-quinolinyl, 2-furyl, 3-furyl and 1-methyl-2-pyrryl.

Examples of a $C_1$-$C_{20}$hydrocarbon radical containing one or more halogen or pseudo-halogen, e.g. 1, 2, 3, 4, 5, or 6 —F, —Cl or —Br, are 1-bromo-2-methylpropyl, dichloromethyl, pentafluoroethyl, 3,5-bis[trifluoromethyl]phenyl, 2,3,5,6-tetrafluoro-p-tolyl, 2,3-dichlorophenyl, 3,4-dichlorophenyl and 2,4-bis[trifluoromethyl]phenyl.

An example of tri($C_1$-$C_{10}$alkyl)silyl is $(H_3C)_3Si$—.

An example of tri($C_1$-$C_{10}$alkyl)silyl($C_1$-$C_{10}$alkyl) is $(H_3C)_3Si$—$(CH_2)_2$—.

Examples of a saturated or unsaturated aliphatic polyamine having 3 to 25 carbon atoms and y amino groups and optionally containing further hetero atom in its skeleton are 1,3-diaminopropane, 1,4-diaminobutane and 1,5-diaminopentane.

Examples of a saturated or unsaturated alicyclic polyamine having 6 to 25, preferably 6 to 13, carbon atoms and y amino groups and optionally containing further hetero atom in its skeleton are 1,2-diaminocyclohexane, 1,4-diaminocyclohexane, 4,4'-diaminodicyclohexyl, 4,4'-diamino-3,3'-dimethyldicyclohexyl, 4,4'-diaminodicyclohexylmethane, 4,4'-diamino-3,3'-dimethyldicyclohexylmethane, 1,3-bis(aminomethyl)cyclohexane, 1,4-bis(aminomethyl)cyclohexane, isophoronediamine, menthenediamine, melamine, 1,3,5-triaminocyclohexane, 1,2,4-triaminocyclohexane, 1,2,4,5-tetraaminocyclohexane and the like.

Examples of an aromatic polyamine having 6 to 25, preferably 6 to 17, in particular 6 to 13, carbon atoms and y amino groups and optionally containing further hetero atoms in its skeleton are o-phenylenediamine, m-phenylenediamine, p-phenylenediamine, 2,3-diaminotoluene, 2,4-diaminotoluene, 2,6-diaminotoluene, 3,4-diaminotoluene, 4,6-dimethyl-m-phenylenediamine, 2,5-dimethyl-p-phenylenediamine, 4,5-dimethyl-o-phenylenediamine, 2,4-diaminomesitylene, 2,3-diaminopyridine, 2,6-diaminopyridine, 3,4-diaminopyridine, 1,5-diaminonaphthalene, 1,8-diaminonaphthalene, 2,3-diaminonaphthalene, 2,7-diaminonaphthalene, 9,10-diaminophenanthrene, 3,3',5,5'-tetramethylbenzidine, 3,3'-dimethyl-4,4'-diaminobiphenyl, 3,3'-dimethoxy-4,4'-diaminobiphenyl, 4,4'-diaminodiphenylmethane, 3,3'-diaminodiphenylmethane, 3,4'-diaminodiphenylmethane, 4,4'-methylenedi-o-toluidine, 4,4'-methylenedi-2,6-xylidine, 4,4'-methylenedi-2,6-diethylaniline, 4,4'-diamino-1,2-diphenylethane, 4,4'-diamino-2,2'-dimethylbibenzyl, 4,4'-diaminostilbene, 3,4'-diamino-2,2-diphenylpropane, 4,4'-diamino-2,2-diphenylpropane, 4,4'-diaminodiphenylether, 3,4'-diaminodiphenylether, 4,4'-thiodianiline, 2,2'-dithiodianiline, 4,4'-dithiodianiline, 3,3'-diaminodiphenylsulfone, 4,4'-diaminodiphenylsulfone, 3,3'-diaminobenzophenone, 4,4'-diaminobenzophenone, 4,4'-diaminobenzanilide, o-tolidinesulfone, 2,7-diaminofluorene, 3,7-diamino-2-methoxyfluorene, bis-p-aminophenylaniline, 1,3-bis(4-aminophenylpropyl)benzene, 1,4-bis(4-aminophenylpropyl)benzene, 1,3-bis(4-aminophenoxy)benzene, 1,4-bis(4-aminophenoxy)benzene, 4,4'-bis(4-aminophenoxy)biphenyl, bis[4-(4-aminophenoxy)phenyl]ether, bis[4-(4-aminophenoxy)phenyl]sulfone, 9,9-bis(4-aminophenyl)fluorene-1,2,4,5-tetraaminobenzene, 1,3,5-triaminobenzene, 1,2,4-triaminobenzene, Para Rosaniline, 2,4,6-triaminophenol, 3,3'-diaminobenzidine, tris(4-aminophenyl)methane, 2,4,6-triaminopyrimidine, and the like.

Examples of an unsaturated or saturated aliphatic amino carboxylic acid having 2 to 25, preferably 2 to 12, in particular 2 to 5, carbon atoms, z' amino groups and z" carboxyl groups and optionally containing further hetero atoms in its skeleton are aminoacetic acid, alpha-aminopropionic acid, beta-aminopropionic acid, alpha-aminoacrylic acid, alpha-aminobutyric acid, beta-aminobutyric acid, gamma-aminobutyric acid, alpha-amino-alpha-methylbutyric acid, gamma-amino-alpha-methylbutyric acid, alpha-aminoisobutyric acid, beta-aminoisobutyric acid, alpha-amino-n-valeric acid, delta-amino-n-valeric acid, beta-aminocrotonic acid, alpha-amino-beta-methylvaleric acid, alpha-aminoisovaleric acid, 2-amino-4-pentenoic acid, alpha-amino-n-caproic acid, 6-aminocaproic acid, alpha-aminoisocaproic acid, 7-aminoheptanoic acid, alpha-amino-n-caprylic acid, 8-aminocaprylic acid, 9-aminononanoic acid, 11-aminoundecanoic acid, 12-aminododecanoic acid, 2-aminoadipic acid, arginine, asparagine, aspartic acid, cystine, glutamic acid, glutamine, ornithine, creatine, S-(carboxymethyl)cystine, aminomalonic acid, and the like.

Examples of a saturated or unsaturated alicyclic amino carboxylic acid having 7 to 25, preferably 7 to 9, carbon atoms, z' amino groups and z" carboxyl groups and optionally containing further hetero atoms in its skeleton are 1-aminocyclohexanecarboxylic acid, 2-aminocyclohexanecarboxylic acid, 3-aminocyclohexanecarboxylic acid, 4-aminocyclohexanecarboxylic acid, p-aminomethylcyclohexanecarboxylic acid, 2-amino-2-norbornanecarboxylic acid, 3,5-diaminocyclohexanecarboxylic acid, 1-amino-1,3-cyclohexanedicarboxylic acid and the like.

Examples of an aromatic amino carboxylic acid having 7 to 25, preferably 7 to 15, in particular 7 to 11, carbon atoms, z' amino groups and z" carboxyl groups and optionally containing further hetero atoms in its skeleton are alphaaminophenylacetic acid, alpha-amino-beta-phenylpropionic acid, 2-amino-2-phenylpropionic acid, 3-amino-3-phenylpropionic acid, alpha-amino cinnamic acid, 2-amino-4-phenylbutyric acid, 4-amino-3-phenylbutyric acid, anthranilic acid, m-aminobenzoic acid, p-aminobenzoic acid, 2-amino-4-methylbenzoic acid, 2-amino-6-methylbenzoic acid, 3-amino-4-methylbenzoic acid, 2-amino-3-methylbenzoic acid, 2-amino-5-methylbenzoic acid, 4-amino-2-methylbenzoic acid, 4-amino-3-methylbenzoic acid, 2-amino-3-methoxybenzoic acid, 3-amino-4-methoxybenzoic acid, 4-amino-2-methoxybenzoic acid, 4-amino-3-methoxybenzoic acid, 2-amino-4,5-dimethoxybenzoic acid, o-aminophenylacetic acid, m-aminophenylacetic acid, p-aminophenylacetic acid, 4-(4-aminophenyl)butyric acid, 4-aminomethylbenzoic acid, 4-aminomethylphenylacetic acid, o-aminocinnamic acid, m-aminocinnamic acid, p-aminocinnamic acid, p-aminohippuric acid, 2-amino-1-naphthoic acid, 3-amino-1-naphthoic acid, 4-amino-1-naphthoic acid, 5-amino-1-naphthoic acid, 6-amino-1-naphthoic acid, 7-amino-1-naphthoic acid, 8-amino-1-naphthoic acid, 1-amino-2-naphthoic acid, 3-amino-2-naphthoic acid, 4-amino-2-naphthoic acid, 5-amino-2-naphthoic acid, 6-amino-2-naphthoic acid, 7-amino-2-naphthoic acid, 8-amino-2-naphthoic acid, 3,5-diaminobenzoic acid, 4,4'-diamino-3,3'-dicarboxydiphenylmethane and the like.

Examples of halogen or pseudo-halogen are —F, —Cl, —Br, —I, —CN, —CNO, —OCN, —SCN and —CNS.

x and y are 2, 3, 4, 5 or 6, preferably 2 or 3, in particular 3.

The sum of z' and z" is 2, 3, 4, 5 or 6, preferably 2 or 3, in particular 3.

Preferred is a film containing a nucleating agent of the formula (IA), (IB) or (IC) wherein x, y or the sum of z' and z" are 2 or 3, and
when x, y or the sum of z' and z" are 2, $X_0$, $Y_0$, and $Z_0$ are the group of the formula

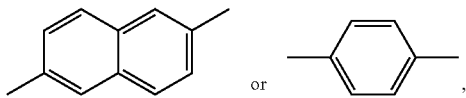

and
when x, y or the sum of z' and z" are 3, $X_0$, $Y_0$, and $Z_0$ are the group of the formula

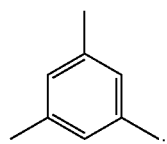

Particularly preferred is a film containing a nucleating agent of the formula (IA), (IB) or (IC) wherein
the radicals $X_1$, $Y_1$, $Z_1$ and $Z_2$ independently of one another are
$C_1$-$C_{10}$alkyl unsubstituted or substituted by 1, 2 or 3 hydroxy, amino and/or nitro;
$C_2$-$C_{20}$alkenyl unsubstituted or substituted by 1, 2 or 3 hydroxy, amino and/or nitro;
$C_2$-$C_{10}$alkyl interrupted by oxygen;
$C_3$-$C_6$cycloalkyl unsubstituted or substituted by 1, 2, 3 or 4 $C_1$-$C_4$alkyl;
($C_3$-$C_6$cycloalkyl)-$C_1$-$C_{10}$alkyl unsubstituted or substituted by 1, 2 or 3 $C_1$-$C_4$alkyl;
bis[$C_3$-$C_6$cycloalkyl]-$C_1$-$C_{10}$alkyl unsubstituted or substituted by 1, 2 or 3 $C_1$-$C_4$alkyl;

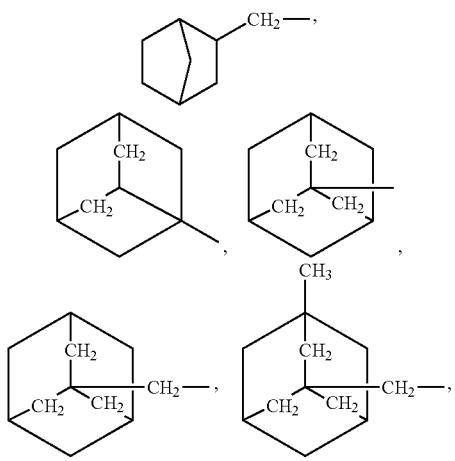

phenyl unsubstituted or substituted by 1, 2 or 3 radicals selected from $C_1$-$C_4$alkyl, $C_1$-$C_4$alkoxy, $C_1$-$C_4$alkylamino, di($C_1$-$C_4$alkyl)amino, amino, hydroxy and nitro;
phenyl-$C_1$-$C_{10}$alkyl unsubstituted or substituted by 1, 2 or 3 radicals selected from $C_1$-$C_4$alkyl, $C_3$-$C_6$cycloalkyl, phenyl, $C_1$-$C_4$alkoxy, hydroxy, amino and nitro;
phenylethenyl unsubstituted or substituted by 1, 2 or 3 $C_1$-$C_4$alkyl;
biphenyl-($C_1$-$C_{10}$alkyl) unsubstituted or substituted by 1, 2 or 3 $C_1$-$C_4$alkyl;
naphthyl unsubstituted or substituted by 1, 2 or 3 $C_1$-$C_4$alkyl;
naphthyl-$C_1$-$C_{10}$alkyl unsubstituted or substituted by 1, 2 or 3 $C_1$-$C_4$alkyl;
naphthoxymethyl unsubstituted or substituted by 1, 2 or 3 $C_1$-$C_4$alkyl;
biphenylenyl, fluorenyl, anthryl;
3-pyridinyl, 4-pyridinyl, 2-hydroxypyridin-3-yl, 3-quinolinyl, 4-quinolinyl, 2-furyl, 3-furyl, 1-methyl-2-pyrryl;
1-bromo-2-methylpropyl, dichloromethyl, pentafluoroethyl, 3,5-bis[trifluoromethyl]phenyl, 2,3,5,6-tetrafluoro-p-tolyl, 2,3-dichlorophenyl, 3,4-dichlorophenyl or 2,4-bis[trifluoromethyl]phenyl;
tri($C_1$-$C_{10}$alkyl)silyl; or
tri($C_1$-$C_{10}$alkyl)silyl($C_1$-$C_{10}$alkyl).

Further preferred is a film containing a nucleating agent of the formula (IA), (IB) or (IC) wherein
the radicals $X_1$, $Y_1$, $Z_1$ and $Z_2$ independently of one another are branched $C_3$-$C_{10}$alkyl;
$C_3$-$C_{10}$alkyl interrupted by oxygen;
$C_3$-$C_6$cycloalkyl unsubstituted or substituted by 1, 2, 3 or 4 $C_1$-$C_4$alkyl;
($C_3$-$C_6$cycloalkyl)-$C_1$-$C_{10}$alkyl unsubstituted or substituted by 1, 2 or 3 $C_1$-$C_4$alkyl;

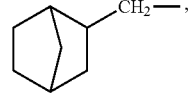

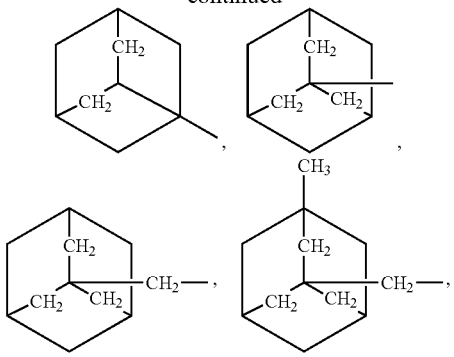

phenyl unsubstituted or substituted by 1, 2 or 3 $C_1$-$C_4$alkyl;
phenyl-$C_1$-$C_{10}$alkyl unsubstituted or substituted by 1, 2 or 3 radicals selected from $C_1$-$C_4$alkyl and $C_1$-$C_4$alkoxy;
biphenyl-($C_1$-$C_{10}$alkyl);
naphthyl-$C_1$-$C_{10}$alkyl;
tri($C_1$-$C_{10}$alkyl)silyl; or
tri($C_1$-$C_4$alkyl)silyl($C_1$-$C_5$alkyl).

Also of interest is a film containing a nucleating agent of the formula (IA) wherein x is 2 or 3,
when x is 2, $X_0$ is the group of the formula

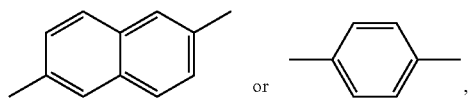

and
when x is 3, $X_0$ is the group of the formula

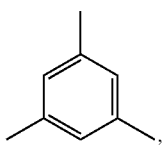

and
the radicals $X_1$ independently of one another are n-propyl, i-propyl, n-butyl, 1,1-dimethylethyl, 1-methylpropyl, 2-methylpropyl, n-pentyl, 1,1-dimethylpropyl, 1,2-dimethylpropyl, 2,2-dimethylpropyl, 1-ethylpropyl, 1-methylbutyl, 2-methylbutyl, 3-methylbutyl, n-hexyl, 2,2-dimethylbutyl, 3,3-dimethylbutyl, 2-ethylbutyl, 2-ethylhexyl, 5-ethylhexyl, n-octyl, 1,1,3,3-tetramethylbutyl, 2,2,4-trimethylpentyl, 3,7-dimethyloctyl, cyclobutyl, cyclopentyl, cyclohexyl, 2-methyl-cyclohexyl, 3-methyl-cyclohexyl, 4-methyl-cyclohexyl, 2,3-dimethyl-cyclohexyl, 3,3,5-trimethyl-cyclohexyl, 1-cyclohexyl-ethyl, cycloheptyl, cyclooctyl, cyclododecyl, phenyl, benzyl, 1-phenylethyl, 2-phenylethyl, cumyl, 2-methylphenyl, 3-methylphenyl, 4-methyl-phenyl, 2-ethylphenyl, 3-ethylphenyl, 4-ethylphenyl, 2,3-dimethylphenyl, 3,5-dimethylphenyl, 2,3,5-trimethylphenyl, 2,4,6-trimethylphenyl, 4-n-butylphenyl, 4-tert-butylphenyl, 4-methoxyphenyl.

Of further interest is a film containing a nucleating agent of the formula (IB) wherein y is 2 or 3,
when y is 2, $Y_0$ is the group of the formula

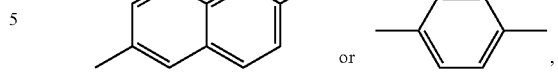

and
when y is 3, $Y_0$ is the group of the formula

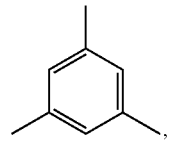

and
the radicals $Y_1$ independently of one another are n-propyl, i-propyl, n-butyl, 1,1-dimethylethyl, 1-methylpropyl, 2-methylpropyl, n-pentyl, 1,1-dimethylpropyl, 1,2-dimethylpropyl, 2,2-dimethylpropyl, 1-ethylpropyl, 1-methylbutyl, 2-methylbutyl, 3-methylbutyl, n-hexyl, 2,2-dimethylbutyl, 3,3-dimethylbutyl, 2-ethylbutyl, 2-ethylhexyl, 5-ethylhexyl, n-octyl, 1,1,3,3-tetramethylbutyl, 2,2,4-trimethylpentyl, 3,7-dimethyloctyl, cyclobutyl, cyclopentyl, cyclohexyl, 2-methyl-cyclohexyl, 3-methyl-cyclohexyl, 4-methyl-cyclohexyl, 2,3-dimethyl-cyclohexyl, 3,3,5-trimethyl-cyclohexyl, 1-cyclohexyl-ethyl, cycloheptyl, cyclooctyl, cyclododecyl, phenyl, benzyl, 1-phenylethyl, 2-phenylethyl, cumyl, 2-methylphenyl, 3-methylphenyl, 4-methyl-phenyl, 2-ethylphenyl, 3-ethylphenyl, 4-ethylphenyl, 2,3-dimethylphenyl, 3,5-dimethylphenyl, 2,3,5-trimethylphenyl, 2,4,6-trimethylphenyl, 4-n-butylphenyl, 4-tert-butylphenyl, 4-methoxyphenyl.

Likewise of interest is a film containing a nucleating agent of the formula (IC) wherein z' and z" independently of one another are 1 or 2, and
when the sum of z' and z" is 2, $Z_0$ is the group of the formula

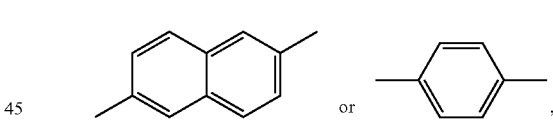

and
when the sum of z' and z" is 3, $Z_0$ is the group of the formula

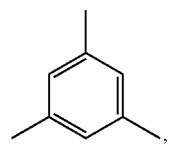

and
the radicals $Z_1$ and $Z_2$ independently of one another are n-propyl, i-propyl, n-butyl, 1,1-dimethylethyl, 1-methylpropyl, 2-methylpropyl, n-pentyl, 1,1-dimethylpropyl, 1,2-dimethylpropyl, 2,2-dimethylpropyl, 1-ethylpropyl, 1-methylbutyl, 2-methylbutyl, 3-methylbutyl, n-hexyl, 2,2-dimethylbutyl, 3,3-dimethylbutyl, 2-ethylbutyl, 2-ethylhexyl, 5-ethylhexyl, n-octyl, 1,1,3,3-tetramethylbutyl, 2,2,4-trimethylpentyl, 3,7-dimethyloctyl, cyclobutyl, cyclopentyl, cyclohexyl, 2-methyl-cyclohexyl, 3-methyl-cyclohexyl, 4-methyl-cyclohexyl, 2,3-dimethyl-cyclohexyl, 3,3,5-trimethyl-cyclohexyl, 1-cyclohexyl-ethyl, cycloheptyl, cyclooctyl, cyclododecyl, phenyl, benzyl, 1-phenylethyl, 2-phenylethyl, cumyl, 2-methylphenyl, 3-methylphenyl, 4-methylphenyl, 2-ethylphenyl, 3-ethylphenyl, 4-ethylphenyl, 2,3-dimethylphenyl, 3,5-dimethylphenyl, 2,3,5-trimethylphenyl, 2,4,6-trimethylphenyl, 4-n-butylphenyl, 4-tert-butylphenyl, 4-methoxyphenyl.

Of particular interest is a film containing a nucleating agent of the formula (IA) wherein x is 3, $X_0$ is the group of the formula

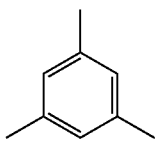

and the radicals $X_1$ are tert-octyl (i.e. 1,1,3,3-tetramethylbutyl).

Also of particular interest is a film containing a nucleating agent of the formula (IB) wherein y is 3, $Y_0$ is the group of the formula

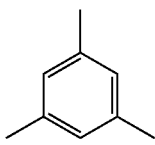

and the radicals $Y_1$ are tert-butyl (i.e. 1,1-dimethylethyl).

Specific examples of compounds of the formula (IA), (IB) or (IC) are
1,3,5-benzenetricarboxylic acid tris(3-methylbutylamide),
1,3,5-benzenetricarboxylic acid tris(cyclopentylamide),
1,3,5-benzenetricarboxylic acid tris(1,2-dimethylpropylamide),
1,3,5-benzenetricarboxylic acid tris(cyclohexylamide),
1,3,5-benzenetricarboxylic acid tris(tert-octylamide),
1,3,5-benzenetricarboxylic acid tris(3,7-dimethyloctylamide),
1,3,5-benzenetricarboxylic acid tris(1,1-dimethylpropylamide),
1,3,5-benzenetricarboxylic acid tris(tert-butylamide),
1,3,5-benzenetricarboxylic acid tris(cyclohexylmethylamide),
1,3,5-benzenetricarboxylic acid tris(isobutylamide),
1,3,5-benzenetricarboxylic acid tris(2-methylcyclohexylamide),
1,3,5-benzenetricarboxylic acid tris(1,1-dimethylpropylamide),
1,3,5-benzenetricarboxylic acid tris(isopropylamide),
1,3,5-benzenetricarboxylic acid tris(2-butylamide),
1,3,5-benzenetricarboxylic acid tris(1-adamantylamide),
1,3,5-benzenetricarboxylic acid tris(1-ethylpropylamide),
1,3,5-benzenetricarboxylic acid tris(3,3,5-trimethylcyclohexylamide),
1,3,5-benzenetricarboxylic acid tris(4-methylcyclohexylamide),
1,3,5-benzenetricarboxylic acid tris(cyclobutylamide),
1,3,5-benzenetricarboxylic acid tris(n-butylamide),
1,3,5-benzenetricarboxylic acid tris(4-tert-butylphenylamide),
1,3,5-benzenetricarboxylic acid tris(4-(trifluoromethoxy)phenylamide),
1,3,5-benzenetricarboxylic acid tris(pentafluorophenylamide),
1,3,5-benzenetricarboxylic acid tris(2-ethylphenylamide),
1,3,5-benzenetricarboxylic acid tris(2,4-dimethylphenylamide),
1,3,5-benzenetricarboxylic acid tris(3,5-bis(triflouromethyl)phenylamide),
1,3,5-benzenetricarboxylic acid tris(4-n-butylphenylamide),
1,3,5-benzenetricarboxylic acid tris(cycloheptylamide),
1,3,5-benzenetricarboxylic acid tris(1-cyclohexylethylamide),
1,3,5-benzenetricarboxylic acid tris(2,4,6-trimethylphenylamide),
1,3,5-benzenetricarboxylic acid tris(4-methylphenylamide),
1,3,5-benzenetricarboxylic acid tris(benzylamide),
1,3,5-benzenetricarboxylic acid tris(cyclopropylamide),
1,3,5-benzenetricarboxylic acid tris(4-ethoxyphenylamide),
1,3,5-benzenetricarboxylic acid tris(3-methylphenylamide),
1,3,5-benzenetricarboxylic acid tris(phenylamide),
1,3,5-benzenetricarboxylic acid tris(4-methoxyphenylamide),
1,3,5-benzenetricarboxylic acid tris(2,3-dimethylphenylamide),
1,3,5-benzenetricarboxylic acid tris(3,5-difluorophenylamide),
1,3,5-benzenetricarboxylic acid tris(4-fluorophenylamide),
1,3,5-benzenetricarboxylic acid tris(cyclododecylamide),
1,3,5-benzenetricarboxylic acid tris(2-methylphenylamide),
1,3,5-benzenetricarboxylic acid tris(3,5-dimethylphenylamide),
1,3,5-benzenetricarboxylic acid tris(3,4-dimethylphenylamide),
1,3,5-benzenetricarboxylic acid tris(3-methylcyclohexylamide),
1,3,5-benzenetricarboxylic acid tris(cyclooctylamide),
1,3,5-benzenetricarboxylic acid tris(2,3-dimethylcyclohexylamide),
1,3,5-tris[cyclohexylcarbonylamino]benzene,
1,3,5-tris[2,2-dimethylpropionylamino]benzene,
1,3,5-tris[4-methylbenzoylamino]benzene,
1,3,5-tris[3,4-dimethylbenzoylamino]benzene,
1,3,5-tris[3,5-dimethylbenzoylamino]benzene,
1,3,5-tris[cyclopentanecarbonylamino]benzene,
1,3,5-tris[1-adamantanecarbonylamino]benzene,
1,3,5-tris[2-methylpropionylamino]benzene,
1,3,5-tris[3,3-dimethylbutyrylamino]benzene,
1,3,5-tris[2-ethylbutyrylamino]benzene,
1,3,5-tris[2,2-dimethylbutyrylamino]benzene,
1,3,5-tris[2-cyclohexyl-acetylamino]benzene,
1,3,5-tris[3-cyclohexyl-propionylamino]benzene,
1,3,5-tris[4-cyclohexyl-butyrylamino]benzene,
1,3,5-tris[5-cyclohexyl-valeroylamino]benzene,
1-isobutyrylamino-3,5-bis[pivaloylamino]benzene,
2,2-dimethylbutyrylamino-3,5-bis[pivaloylamino]benzene,
3,3-dimethylbutyrylamino-3,5-bis[pivaloylamino]benzene,
1,3-bis[isobutyrylamino]-5-pivaloylaminobenzene,
1,3-bis[isobutyrylamino]-5-(2,2-dimethyl-butyryl)aminobenzene,
1,3-bis[isobutyrylamino]-5-(3,3-dimethyl-butyryl)aminobenzene,
1,3-bis[2,2-dimethylbutyrylamino]-5-pivaloylaminobenzene,
1,3-bis[2,2-dimethylbutyrylamino]-5-isobutyrylaminobenzene, 1,3-bis[2,2-dimethylbutyrylamino]-5-(3,3-dimethylbutyryl)-aminobenzene,
1,3-bis[3,3-dimethylbutyrylamino]-5-pivaloylaminobenzene,
1,3-bis[3,3-dimethylbutyrylamino]-5-isobutyryl-aminobenzene,
1,3-bis[3,3-dimethylbutyrylamino)-5-(2,2-dimethyl-butyrylamino)aminobenzene,
1,3,5-tris[3-(trimethylsilyl)propionylamino]benzene,
N-t-butyl-3,5-bis-(3-methylbutyrylamino)-benzamide,
N-t-butyl-3,5-bis-(pivaloylamino)-benzamide,
N-t-octyl-3,5-bis-(pivaloylamino)-benzamide,
N-(3,7-dimethyloctyl)-3,5-bis-(pivaloylamino)-benzamide,
N-(1,1-dimethyl-propyl)-3,5-bis-(pivaloylamino)-benzamide,
N-(t-octyl)-3,5-bis-(isobutyrylamino)-benzamide,
N-(t-butyl)-3,5-bis-(pivaloylamino)-benzamide,
N-(2,3-dimethyl-cyclohexyl)-3,5-bis-(pivaloylamino)-benzamide,
N-t-butyl-3,5-bis-(cyclopentanecarbonylamino)-benzamide,
N-(3-methylbutyl)-3,5-bis-(3-methylbutyrylamino)-benzamide,
N-(3-methylbutyl)-3,5-bis-(pivaloylamino)-benzamide,
N-(3-methylbutyl)-3,5-bis-(4-methylpentanoylamino)-benzamide,
N-(3-methylbutyl)-3,5-bis-(cyclopentanecarbonylamino)-benzamide,
N-(3-methylbutyl)-3,5-bis-(cyclohexanecarbonylamino)-benzamide,
N-(3,7-dimethyloctyl)-3,5-bis-(cyclohexanecarbonylamino)-benzamide,
N-cyclopentyl-3,5-bis-(3-methylbutyrylamino)-benzamide,
N-cyclopentyl-3,5-bis-(pivaloylamino)-benzamide,
N-cyclopentyl-3,5-bis-(4-methylpentanoylamino)-benzamide,
N-cyclopentyl-3,5-bis-(cyclopentanecarbonylamino)-benzamide,
N-cyclopentyl-3,5-bis-(cyclohexanecarbonylamino)-benzamide,
N-cyclohexyl-3,5-bis-(3-methylbutyrylamino)-benzamide,
N-cyclohexyl-3,5-bis-(pivaloylamino)-benzamide,
N-cyclohexyl-3,5-bis-(4-methylpentanoylamino)-benzamide,
N-cyclohexyl-3,5-bis-(cyclopentanecarbonylamino)-benzamide,
N-cyclohexyl-3,5-bis-(cyclohexanecarbonylamino)-benzamide,
N-isopropyl-3,5-bis-(pivaloylamino)-benzamide,
N-isopropyl-3,5-bis-(isobutyrylamino)-benzamide,
N-(3,7-dimethyloctyl)-3,5-bis-(2,2-dimethylbutyrylamino)-benzamide
N-t-butyl-3,5-bis-(2,2-dimethylbutyrylamino)-benzamide,
N-t-octyl-3,5-bis-(2,2-dimethylbutyrylamino)-benzamide,
5-pivaloylamino-isophthalic acid N,N'-di-t-butyldiamide,
5-pivaloylamino-isophthalic acid N,N'-di-t-octyldiamide,
5-pivaloylamino-isophthalic acid N,N'-bis-(3,7-dimethyloctyl)diamide,
5-(2,2-dimethylbutyrylamino)-isophthalic acid N,N'-di-t-butyldiamide,
5-(2,2-dimethylbutyrylamino)-isophthalic acid N,N'-di-t-octyldiamide,
5-(2,2-dimethylbutyrylamino)-isophthalic acid N,N'-bis-(3,7-dimethyloctyl)diamide,
5-(3-methylbutyrylamino)-isophthalic acid N,N'-di-cyclohexyldiamide,
5-(pivaloylamino)-isophthalic acid N,N'-di-cyclohexyldiamide,
5-(cyclopentanecarbonylamino)-isophthalic acid N,N'-di-cyclohexyldiamide,
5-(cyclohexylcarbonylamino)-isophthalic acid N,N'-di-cyclohexyldiamide,
5-(cyclohexylcarbonylamino)-isophthalic acid N,N'-bis-(3,7-dimethyloctyl)diamide,
5-(cyclopentanecarbonylamino)-isophthalic acid N,N'-bis-(2-methylcyclohexyl)diamide,
5-(cyclohexanecarbonylamino)-isophthalic acid N,N'-bis-(2-methylcyclohexyl)diamide,
5-((1-methylcyclohexanecarbonyl)amino)-isophthalic acid N,N'-bis-(2-methylcyclohexyl)diamide,
5-((2-methylcyclohexanecarbonyl)amino)-isophthalic acid N,N'-bis-(2-methylcyclohexyl)diamide.

One embodiment of the present invention is a method for enhancing the Modulus, according to EN ISO 527, of an extruded air cooled blown film by at least 10% versus a non-nucleated reference film, said film having
a) a total thickness of 5 to 500 μm,
b) a mono-layer structure or 2 to 9 coextruded layers,
c) at least one layer L containing a polymer selected from the group consisting of polypropylene homopolymers, polypropylene random copolymers, hetero-phasic polypropylene block copolymers, or any mixtures thereof, said polymer having a melt flow rate, according to ASTM D-1238, of 0.1 to 10 dg/min at 230° C. and 2.16 kg;
which method comprises
incorporating into the polymer 0.001 to 2%, relative to the weight of the polymer, of a nucleating agent of the formula (IA), (IB) or (IC) as defined above.

A further embodiment of the present invention relates to a method for increasing the stiffness of an extruded air cooled blown film without impairing its elastic properties, said film having
a) a total thickness of 5 to 500 μm,
b) a mono-layer structure or 2 to 9 coextruded layers,
c) at least one layer L containing a polymer selected from the group consisting of polypropylene homopolymers, polypropylene random copolymers, hetero-phasic polypropylene block copolymers, or any mixtures thereof, said polymer having a melt flow rate, according to ASTM D-1238, of 0.1 to 10 dg/min at 230° C. and 2.16 kg;
which method comprises
incorporating into the polymer 0.001 to 2%, relative to the weight of the polymer, of a nucleating agent of the formula (IA), (IB) or (IC) as defined above.

Another embodiment of the present invention relates to a method for additionally reducing the Haze of an extruded air cooled blown film without impairing its clarity, said film having
a) a total thickness of 5 to 500 μm,
b) a mono-layer structure or 2 to 9 coextruded layers,
c) at least one layer L containing a polymer selected from the group consisting of polypropylene homopolymers, polypropylene random copolymers, hetero-phasic polypropylene block copolymers, or any mixtures thereof, said polymer having a melt flow rate, according to ASTM D-1238, of 0.1 to 10 dg/min at 230° C. and 2.16 kg;
which method comprises
incorporating into the polymer 0.001 to 2%, relative to the weight of the polymer, of a nucleating agent of the formula (IA), (IB) or (IC) as defined above.

Still another embodiment of the present invention relates to a method for additionally clarifying an extruded air cooled blown film without provoking sublimation, volatilization or blooming of a nucleating agent added, said film having a) a total thickness of 5 to 500 μm,
b) a mono-layer structure or 2 to 9 coextruded layers,
c) at least one layer L containing a polymer selected from the group consisting of polypropylene homopolymers, polypropylene random copolymers, hetero-phasic polypropylene block copolymers, or any mixtures thereof, said polymer having a melt flow rate, according to ASTM D-1238, of 0.1 to 10 dg/min at 230° C. and 2.16 kg;
which method comprises
incorporating into the polymer 0.001 to 2%, relative to the weight of the polymer, of a nucleating agent of the formula (IA), (IB) or (IC) as defined above.

The present invention includes the use of the films of the invention in such applications as consumer liners, heavy duty shipping sacks, produce bags, batch inclusion bags, pouches, grocery bags, merchandise bags, bags for foam packaging (especially where the foam is formed in the bag), cereal liners, heat seal films, soft paper overwrap, multi-wall bags, baler bags, bundling films, compression films and laminations.

Films of the current invention are particularly useful for stand-up pouches, heavy-duty bags, and as films for retort and hot-fill applications.

Thus, a further embodiment of the present invention relates to an article containing an extruded air cooled blown film as defined herein, said article being a packaging material (preferably for consumer goods, for various kinds of food, retort films, microwavable bags or pouches, freezer bags); an industrial material (preferably stretch or cling films, or heavy duty liners); a hygienic or medical material (preferably vapor sterilizable bags, pouches, IV or serum containers); a decoration or utility material (preferably flower wrap or shopping bags); or an agricultural material (preferably geoliners, mulch films or greenhouse films).

Another embodiment of the present invention relates to a method for the manufacture of an extruded air cooled blown film as defined herein with an industrial blown film line comprising:
P-I) admixing the nucleating agent with the polymer in a batch-wise or continuous manner;
P-II) melt extrusion of said admixture on a single- or twin-screw extruder to achieve homogeneity within the resulting melt at a temperature of at least 20° C., preferably at least 50° C., above the melting point of the polymer;
P-III) pressing said melt or combining the melt-feed of two or more polymers, optionally from separate extruders, through the ring-shaped opening of a circular die to form a continuous cylinder of 0.1 to 5 mm, preferably 0.5 to 3 mm, wall thickness;
P-IV) expanding said cylinder into a bubble at a blow-up ratio of 1.5 to 8, preferably 2 to 5, and drawing simultaneously at a stretching ratio of 2 to 40, preferably 4 to 20, and
P-V) further cooling of said bubble by the inflated air and forming the solid tubular film thereof.

A preferred process comprises the more specific steps
P-I) admixing the powdery, pelletized or granular nucleating agent or any concentrate or masterbatch thereof with the polypropylene in form of powder, beads, pellets or granules via powder or pellet pre-blending in a batch-wise or continuous manner, including the continuous admixing of slurries, solutions or melted masterbatches of the nucleating agent to the polypropylene bulk in its solid or melted form;
P-II) melt extrusion of said admixture by subsequent feeding, heating, shear-mixing, compressing etc. on a single- or twin-screw extruder to achieve homogeneity within the resulting melt at a temperature of at least 20° C., preferably at least 50° C., above the melting point of the polymer, in particular at temperature from 180 to 280° C.;
P-III) pressing said melt or combining the melt-feed of two or more polymers, optionally from separate extruders, either directly or via gear pumps, through screen-pack filters for melt filtration into the ring-shaped opening of a circular die to form a continuous cylinder of 0.1 to 5 mm, preferably 0.5 to 3 mm, wall thickness;
P-IV) expanding said cylinder by air inflation though the center of the die into a bubble, adjusting a blow-up ratio of 1.5 to 8, preferably 2 to 5, and drawing simultaneously at a stretching ratio of 2 to 40, preferably 4 to 20, in order to achieve the desired thickness and width of the resulting film; and
P-V) further cooling of said bubble by the inflated air and forming the solid tubular film thereof, which is then continuously pulled-off and flattened to provide subsequent cutting, surface treatment and the like or direct winding on take-up spools.

A further embodiment of the present invention relates to a masterbatch containing
M-I) polyethylene or polypropylene as carrier material and main component,
M-II) 0.1 to 25%, relative to the weight of component M-I), of a nucleating agent of the formula (IA), (IB) or (IC) as defined above, and
M-III) one or more anti-agglomerants at a weight ratio of 20/1 to 1/10, relative to the weight of component M-II), and
M-IV) 0 to 25%, preferably 0.1 to 25%, relative to the weight of component M-I), of one or more co-additives selected from the group consisting of antioxidants, antistatic agents, slip- and anti-blocking agents, anti-fogging agents and light stabilizers.

A masterbatch wherein the nucleating agent is 1,3,5-benzene-tricarboxylic acid-tris(1,1,3,3-tetramethylbutylamide) or 1,3,5-tris[2,2-dimethylpropionylamino]benzene is preferred.

One of the following anti-agglomerants is preferably present in the masterbatch:
Glycerol-monostearate,
glycerol-distearate,
glycerol-monolaurate,
glycerol-dilaurate,
glycerol-monopalmitate,
glycerol-dipalmitate,
sodium stearyl-sulfate,
sodium stearyl-phosphate,
alpha-tocopherol,
calcium-stearate,
magnesium-stearate,
zinc-stearate.

The following examples describe the invention in more detail. All parts and percentages are given by weight unless indicated otherwise.

EXAMPLE 1

Preparation of Masterbatch MB-1 Utilized for Film Production

The following powdery components are intimately pre-blended during five minutes at ambient temperature in a high-speed Henschel (RTM) mixer:

525 g of 1,3,5-tris[2,2-dimethylpropionylamino]benzene as the nucleating agent,
700 g of glycerol mono-stearate as first anti-agglomerant,
350 g of calcium stearate as second anti-agglomerant,
58 g of pentaerythryl-tetrakis(3,5-di-tert-butyl-4-hydroxyphenyl)propionate as primary antioxidant, and
117 g of tris(2,4-di-tert-butylphenyl) phosphite as secondary antioxidant.

The obtained pre-blend of above is then continuously added via a screw feeder (Brabender (RTM), DE) into the main feed of granular polypropylene RB-501 BF (commercial polypropylene random copolymer of *Borealis* (RTM)). Both feeds are then continuously combined in the hopper of a Theysohn (RTM) twin-screw extruder (30 mm×44 D), operated under high-shear conditions and increasing temperature profile (feed-mixing-die) of 210° C.-240° C.-255° C. The feeds of both materials are adjusted to 2.5% let-down ratio of the additives. The melt is then extruded through a 2×3.2 mm twin-die to form stands, which are water-chilled, dried and eventually cut into the granular form of the masterbatch. The actual concentration of the nucleating agent in the final masterbatch is verified by analytical control to be 0.70%.

This masterbatch MB-1 is used for the addition of 200 ppm of the nucleating agent to the polypropylene type PP-1 in Examples 3 to 8, i.e. the MB-1 carrier resin is identical with PP-1.

Careful formulation and sufficient homogenization of the aforementioned components is imperative to ensure good quality of the masterbatch. Inadequate preparation will result in reduced performance during further processing and cause severe problems with formation of film structure and surface defects, like for example streaks or so-called "fisheyes".

EXAMPLE 2

Preparation of a Masterbatch MB-2 Utilized During Film Production

The procedure described in Example 1 is repeated, but substituting the random copolymer of above with the polypropylene homopolymer Moplen HP-522 H (RTM) (commercially available from Basell (RTM)).

The final masterbatch is verified by analysis to contain 0.73% of the nucleating agent. This masterbatch MB-2 is used for the addition of 200 ppm of the nucleating agent to the polypropylene type PP-2 in Examples 3 to 8, i.e. the MB-2 carrier resin is identical with PP-2.

EXAMPLES 3 TO 8

Manufacture of Extruded Air Cooled Blown Films

The examples relate to the manufacture of films on an industrial blown film line, set-up as multi-purpose line for the production of air-cooled films. This line allows production of films up to three layers. The circular die of 25 cm diameter (2.8 mm die gap) can be fed by three independent single screw extruders: Main feeder 90 mm×25 D, each side feeder 60 mm×25 D. The temperatures along the extruder barrels are stepwise increased to achieve a gradient of about 15-20° C.; melt temperatures are kept +/−5° C. constant between extruder exit and the die as listed in the Table 1, column "Melt Temp.".

Total throughput is varied between 230-250 kg/h, corresponding to specific throughputs of 9.2 to 10 kg/h per cm of die diameter, but kept constant in the course of one trial. The flow and feeding characteristics of the polymer melts are monitored online. The results are listed in Table 1 in "g/h/rpm". This unit signifies the quantity of polymer transported per hour at constant revolutions of the extruder screw. Thus, higher values of "g/h/rpm" comply with less energy at constant throughput, respectively allowing higher throughput at constant revolutions per minute (rpm) of the extruder screw.

EXAMPLES 9 TO 11

Three-layer coextruded air cooled blown films are prepared with a Collin (RTM) lab scale multilayer extruder equipped with circular die of 80 mm diameter, gap 0.8 mm, main extruder 25 mm×25 D and side extruder 20 mm×25 D.

In examples 9 and 10 a mixture of polymer PP-1 and MB-1 is prepared so that the final amount of clarifier in each layer of the final plastic article is 100 ppm; this mixture is used to feed the different extruders for the film manufacturing process.

The following polymers (all being commercial grades) are used as received for the manufacture of the blown films described in Tables 1 and 2:
PP-1=Polypropylene random copolymer (RB-501 BF of *Borealis* (RTM)), melt flow rate: 1.9 dg/min at 230° C. and 2.16 kg;
PP-2=Polypropylene homopolymer (Moplen HP-522 H (RTM) of Basell (RTM)), melt flow rate: 2.0 dg/min at 230° C. and 2.16 kg;
PP-1*=blend composed of 97.1% of PP-1 pellets and 2.9% of granular MB-1;
PP-2*=blend composed of 97.2% of PP-2 pellets and 2.8% of granular MB-2;
PP-3*==blend composed of 98.6% of PP-1 pellets and 1.4% of granular MB-1
PE-1=metallocene polyethylene (Exceed 1018 EB (RTM) of ExxonMobil (RTM), melt flow rate: 1.0 dg/min at 190° C. and 2.16 kg;
PE-2=low density polyethylene (Lupolen 2420 F (RTM) of Basell (RTM), melt flow rate: 0.75 dg/min at 2.16 kg and 190° C.;
PE-3=pellet blend composed of 80% of PE-1 with 20% of PE-2.

The addition of the nucleating agents is continuously performed by online dosing of the granular masterbatches MB-1 or MB-2, as indicated above, at suitable let-down ratios (i.e. percentage of (masterbatch (MB) admixture to the polymer main feed). The resulting mixture of pellets is constantly processed and sheared in one or more of the extruders as commented above, eventually resulting in homogeneous polymer melts feeding the circular blowing die. The flow of materials is constantly controlled and adjusted in such a way, that—in case of nucleated films—the final concentration of the nucleating agent is always 200 ppm and kept constant in the course of each trial. Further data on the processing conditions and compositions of the films are given in Table 1. Table 2 shows the testing results obtainable from the film samples.

The Designations and Data Summarized in Table 1 have the Following Significance:

Layers and Thick. refer to the composition by layer of the blown films and their thicknesses.

M. Temp. gives the temperature of the polymer melt having exited the extruder and passing the die entrance, from where it is kept unchanged towards the die exit (die gap).

"g/h/rpm" signifies the grams of polymer transported within one hour per one revolution of the extruder screw, i.e. a measure of the flow- and feeding characteristics of the polymer.

D.D.R. signifies the longitudinal draw down ratio of the film, i.e. the ratio of the eventual pull-off speed of the film relative to the speed of the melt passing the die gap.

B.U.R. signifies the blow-up ratio of the film given by the diameter of the tubular film pulled-off relative to the diameter of the die forming the tubular film "cylinder".

Bubble Stab. signifies the visible stability of the film bubble during the blowing process; irregularities are often audible, too, as stronger sough or noise in the die exit proximity.

Haze determined according to ASTM D-1003 is measured for each blown film; reductions given as negative percentage indicate the improvements achieved with the inventive samples versus the respective references.

Clarity is determined according to ASTM D-1746. Improvements are given as positive percentage versus the respective reference film.

Mod.-MD determined according to EN ISO 527 signifies the Modulus in longitudinal or machine direction, in which the film was blown; percentages of improvements are given versus the respective reference samples.

Mod.-TD complies with Mod.-MD of above, however, referring to the Modulus determined in transversal or cross-machine direction.

TABLE 1

Conditions for the Manufacture of Extruded Air Cooled Blown Films.

| Example | Layers | Thickn. | M. Temp. | "g/h/rpm" | D.D.R. | B.U.R. | Bubble Stab. |
|---|---|---|---|---|---|---|---|
| No. 3 Invention | S1: PE-3<br>L: PP-1*<br>S2: PE-3 | 6 μm<br>38 μm<br>6 μm | 205° C.<br>231° C.<br>201° C. | 2726<br>(+5.9%<br>versus No. 4) | 15.3 | 3.7 | excellent |
| No. 4 Reference | S1: PE-3<br>L: PP-1<br>S2: PE-3 | 6 μm<br>38 μm<br>6 μm | 205° C.<br>231° C.<br>201° C. | 2573 | 15.3 | 3.7 | moderate |
| No. 5 Invention | S1: PP-1*<br>L: PP-1*<br>S2: PP-1* | 18 μm<br>18 μm<br>18 μm | 227° C.<br>225° C.<br>222° C. | 2894<br>(+6.6%<br>versus No. 6) | 14.1 | 3.7 | excellent |
| No. 6 Reference | S1: PP-1<br>L: PP-1<br>S2: PP-1 | 18 μm<br>18 μm<br>18 μm | 227° C.<br>225° C.<br>222° C. | 2716 | 14.0 | 3.8 | fair to poor |
| No. 7 Invention | S1: PE-3<br>L: PP-2*<br>S2: PE-3 | 6 μm<br>24 μm<br>6 μm | 226° C.<br>233° C.<br>217° C. | 2857<br>(+4.1%<br>versus No. 8) | 20.8 | 3.7 | excellent |
| No. 8 Reference | S1: PE-3<br>L: PP-2<br>S2: PE-3 | 6 μm<br>24 μm<br>6 μm | 227° C.<br>232° C.<br>218° C. | 2744 | 20.4 | 3.8 | fair to poor |
| No. 9 Invention | S1: PP-3*<br>L: PP-3*<br>S2: PP-3* | 10 μm<br>10 μm<br>10 μm | 230° C.<br>232° C.<br>229° C. | 5.2 | — | 2.5 | excellent |
| No. 10 Invention | S1: PP-3*<br>L: PP-3*<br>S2: PP-3* | 17 μm<br>17 μm<br>17 μm | 233° C.<br>229° C.<br>233° C. | 5.1 | — | 2.5 | excellent |
| N0. 11 Reference | S1: PP-1<br>L: PP-1<br>S2: PP-1 | 17 μm<br>17 μm<br>17 μm | 230° C.<br>229° C.<br>229° C. | 4.3 | — | 2.5 | fair to poor |

Blown films according to the present invention are the above Examples 3, 5, 7, 9 and 10; Examples 4, 6, 8 and 11 represent comparative films only for reference purposes. The film structures are indicated by designation of the layers signifying S1 and S2 as skin or outer layers; layer L as core or inner layer. Pseudo-monolayer films have identical composition of all layers, as in case of Examples 5, 6, 9 and 10. The Designations and Data Summarized in Table 2 have the Following Significance:

T. Thick. refers to the final thickness of the films actually measured during testing.

E.a.B.-MD determined according to EN ISO 527 signifies the elongation at break of a sample taken from longitudinal or machine direction of the blown film; percentages of improvements are given versus the respective reference samples.

E.a.B.-TD complies with E.a.B.-MD of above, however, referring to the elongation at break determined in transversal or cross-machine direction.

TABLE 2

Physical Properties of the Extruded Air Cooled Blown Films.

| Example | T. Thick. | Haze | Clarity | Mod.-MD | Mod.-TD | E.a.B.-MD | E.a.B.-TD |
|---|---|---|---|---|---|---|---|
| No. 3 Invention | 51 μm | 5.2%<br>(−16% of No. 4) | 98.10%<br>(+0.8% of No. 4) | 268 MPa<br>(+16.2% of No. 4) | 603 MPa<br>(+22.0% of No. 4) | 534%<br>(+2.4% of No. 4) | 687%<br>(+4.5% of No. 4) |
| No. 4 Reference | 51 μm | 6.2% | 97.34 | 230 MPa | 494 MPa | 522% | 657% |

TABLE 2-continued

Physical Properties of the Extruded Air Cooled Blown Films.

| Example | T. Thick. | Haze | Clarity | Mod.-MD | Mod.-TD | E.a.B.-MD | E.a.B.-TD |
|---|---|---|---|---|---|---|---|
| No. 5 Invention | 54 μm | 7.0% (−64% of No. 6) | 94.96% (+5.2% of No. 6) | 418 MPa (+11.3% of No. 6) | 859 MPa (+16.1% of No. 6) | 517% (+3.0% of No. 6) | 735% (+6.5% of No. 6) |
| No. 6 Reference | 53 μm | 19.4% | 90.28% | 376 MPa | 740 MPa | 502% | 690% |
| No. 7 Invention | 35 μm | 4.8% (−43% of No. 8) | 98.22% (+7.9% of No. 8) | 360 MPa (+19.8% of No. 8) | 937 MPa (+21.8% of No. 8) | 601% (+9.7% of No. 8) | 677% (+2.0% of No. 8) |
| No. 8 Reference | 34 μm | 8.4% | 91.02% | 301 MPa | 769 MPa | 457% | 663% |
| No. 9 Invention | 31 μm | 3.1% | 99.68% | — | — | — | — |
| No. 10 Invention | 50 μm | 3.8% (−75% of No. 11) | 99.46% (+11.7% of No. 11) | — | — | — | — |
| No. 11 Reference | 52 μm | 15% | 89% | — | — | — | — |

The data given in the Tables 1 and 2 of above are intended only for the purpose of illustration of the present invention, and are not to be construed to mean any limitation of the scope or of the general applicability of the present invention. Although being self-explanatory by the various improvements achieved, the inventive examples should be understood as follows:

Examples 3 to 6 are based on the use of PP-1 as principal component of the film. The processing stability, in particular the bubble stability of this random copolymer is quite moderate, as outlined in the comparative Example 4. Certain improvements are possible by additional usage of metallocene-PE based skin layers, as outlined in the comparative Example 6. But by using the PE-3, the overall stiffness of the film is heavily affected, which is expressed in the comparatively low values of the Modulus in both, machine or longitudinal direction and cross- or transversal direction.

By usage of the nucleating agents according to the invention, these drawbacks are eliminated as outlined by Examples 3 and 5. The processing stability, in particular the bubble stability, during film blowing becomes excellent. In addition, higher specific throughput (given in "g/h/rpm") is observed further enhancing the smoothness of the total film blowing process. Furthermore, the corresponding film properties given in Table 2 are self-explanatory with regard to the improvements achieved.

The measured values of the Moduli were found to be 11% to 22% higher in comparison to the reference films, which do not contain any nucleating agent. It is important here to note that the enhancements of the Moduli do not affect the elastic properties of the films (percentage of elongation at break); even slightly higher values have been found for the inventive films based on the random copolymer.

Also the aesthetic properties of the films, expressed by lower Haze and higher Clarity values, respectively, are clearly improved in the inventive formulations (Examples 3 and 5) relative to their corresponding reference films (Examples 4 and 6). Haze reduction by −16%, respectively −64% and Clarity enhancement of 0.8%, respectively 5.2% has been achieved by Example 3, respectively Example 5, relative to the corresponding reference films of Example 4, respectively Example 6. The clarified blown film described in Example 5 has remarkable properties. Being a pseudo-monolayer polypropylene film, it merges the benefits of optical, mechanical, easy-to-process and even recycling properties with an outstanding balance.

Examples 7 and 8 are based on the use of PP-2 as principal component of the film. It is known that the overall processibility of this polypropylene homopolymer alone is fairly poor in the blown film process. Even the use of PE-3 skin layers as done in Example 8 results only in marginally better bubble stability. The benefits of the inventive formulations are realized in Example 7. Complementing the excellent processibilities of these clarified polypropylene films, the use of polypropylene homopolymer allows to even further enhance their Moduli at maintained optical clarity, particularly in comparison the aforementioned blown films based on polypropylene random copolymers. Some further film properties given in Table 2 are self-explanatory with regard to the improvements achieved.

As can be seen from Example 7, it should be noted that the presence of PE-3 skin layers might be preferred, when the core layers are based on PP-2* (i.e. clarified polypropylene homopolymer). In this way, it is ensured to combine best optical properties and high moduli with constantly maintained elasticity in longitudinal and transversal direction of the film.

In Examples 9 and 10 concentration of the clarifier is down-gauged to half of the previous examples. In both examples the addition of the clarifier improves remarkably the processing stability as seen in the bubble stability comment. In addition to processing stability, aesthetic properties of these films are very much improved as compared to example 11, where no clarifier was used. Throughput is also increased by around 20%.

This consideration and selection may conclude a sensible balance of all properties to be taken into account in this particular case, although further improvements are obvious to those skilled in the art, based on these novel principal findings according to the invention.

The invention claimed is:

1. An extruded air cooled blown film having
   a) a total thickness of 5 to 500 μm,
   b) a mono-layer structure or 2 to 9 coextruded layers,
   c) at least one layer L containing a polymer selected from the group consisting of polypropylene homopolymers, polypropylene random copolymers, hetero-phasic polypropylene block copolymers, or any mixtures thereof, said polymer having a melt flow rate, according to ASTM D-1238, of 0.1 to 10 dg/min at 230° C. and 2.16 kg, said layer L further containing 0.001 to 2%, relative to the weight of the polymer, of a nucleating agent of formula (IA), (IB) or (IC), $$X_0 \mathord{\relbar\joinrel\relbar} \left[ \begin{array}{c} O \; H \\ \| \; | \\ C \mathord{\relbar\joinrel\relbar} N \mathord{\relbar\joinrel\relbar} X_1 \end{array} \right]_x \quad (IA)$$

$$Y_0 \mathord{\relbar\joinrel\relbar} \left[ \begin{array}{c} H \; O \\ | \; \| \\ N \mathord{\relbar\joinrel\relbar} C \mathord{\relbar\joinrel\relbar} Y_1 \end{array} \right]_y \quad (IB)$$

$$\left[ Z_1 \mathord{\relbar\joinrel\relbar} \begin{array}{c} O \; H \\ \| \; | \\ C \mathord{\relbar\joinrel\relbar} N \end{array} \right]_{z'} \mathord{\relbar\joinrel\relbar} Z_0 \mathord{\relbar\joinrel\relbar} \left[ \begin{array}{c} O \; H \\ \| \; | \\ C \mathord{\relbar\joinrel\relbar} N \mathord{\relbar\joinrel\relbar} Z_2 \end{array} \right]_{z''} \quad (IC)$$

wherein x and y are an integer from 2 to 6;

z' and z" independently of one another are an integer from 1 to 5 with the proviso that the sum of z' and z" is an integer from 2 to 6;

$X_0$ is a residue which is formed by elimination of x carboxyl groups of a saturated or unsaturated aliphatic polycarboxylic acid having 3 to 25 carbon atoms, a residue which is formed by elimination of x carboxyl groups of a saturated or unsaturated alicyclic polycarboxylic acid having 7 to 25 carbon atoms or a residue which is formed by elimination of x carboxyl groups of an aromatic polycarboxylic acid having 8 to 25 carbon atoms; any of said polycarboxylic acids optionally contains further hetero atoms in its skeleton;

the radicals $X_1$ independently of one another are $C_1$-$C_{20}$alkyl unsubstituted or substituted by one or more hydroxy, amino and/or nitro groups;

$C_2$-$C_{20}$alkenyl unsubstituted or substituted by one or more hydroxy, amino and/or nitro groups;

$C_2$-$C_{20}$alkyl interrupted by oxygen or sulfur;

$C_3$-$C_{12}$cycloalkyl unsubstituted or substituted by one or more $C_1$-$C_{20}$alkyl;

($C_3$-$C_{12}$cycloalkyl)-$C_1$-$C_{10}$alkyl unsubstituted or substituted by one or more $C_1$-$C_{20}$alkyl;

bis[$C_3$-$C_{12}$cycloalkyl]-$C_1$-$C_{10}$alkyl unsubstituted or substituted by one or more $C_1$-$C_{20}$alkyl;

a bicyclic or tricyclic hydrocarbon radical with 5 to 20 carbon atoms unsubstituted or substituted by one or more $C_1$-$C_{20}$alkyl;

phenyl unsubstituted or substituted by one or more radicals selected from $C_1$-$C_{20}$alkyl, $C_1$-$C_{20}$alkoxy, $C_1$-$C_{20}$alkylamino, di($C_1$-$C_{20}$alkyl)amino, amino, hydroxy and nitro;

phenyl-$C_1$-$C_{20}$alkyl unsubstituted or substituted by one or more radicals selected from $C_1$-$C_{20}$alkyl, $C_3$-$C_{12}$cycloalkyl, phenyl, $C_1$-$C_{20}$alkoxy, amino, hydroxy and nitro;

phenylethenyl unsubstituted or substituted by one or more $C_1$-$C_{20}$alkyl;

biphenyl-($C_1$-$C_{10}$alkyl) unsubstituted or substituted by one or more $C_1$-$C_{20}$alkyl;

naphthyl unsubstituted or substituted by one or more $C_1$-$C_{20}$alkyl;

naphthyl-$C_1$-$C_{20}$alkyl unsubstituted or substituted by one or more $C_1$-$C_{20}$alkyl;

naphthoxymethyl unsubstituted or substituted by one or more $C_1$-$C_{20}$alkyl;

biphenylenyl, fluorenyl, anthryl;

a 5- to 6-membered heterocyclic radical unsubstituted or substituted by one or more $C_1$-$C_{20}$alkyl;

a $C_1$-$C_{20}$hydrocarbon radical containing one or more halogen or pseudo-halogen;

tri($C_1$-$C_{10}$alkyl)silyl; or tri($C_1$-$C_{10}$alkyl)silyl($C_1$-$C_{10}$alkyl);

$Y_0$ is a residue which is formed by elimination of y amino groups of a saturated or unsaturated aliphatic polyamine having 3 to 25 carbon atoms, a residue which is formed by elimination of y amino groups of a saturated or unsaturated alicyclic polyamine having 6 to 25 carbon atoms or a residue which is formed by elimination of y amino groups of an aromatic polyamine having 6 to 25 carbon atoms; any of said polyamines optionally contains further hetero atoms in its skeleton;

the radicals $Y_1$ independently of one another have one of the definitions of $X_1$;

$Z_0$ is a residue which is formed by elimination of z' amino groups and z" carboxyl groups of an unsaturated or saturated aliphatic amino carboxylic acid having 2 to 25 carbon atoms, a residue which is formed by elimination of z' amino groups and z" carboxyl groups of a saturated or unsaturated alicyclic amino carboxylic acid having 7 to 25 carbon atoms or a residue which is formed by elimination of z' amino groups and z" carboxyl groups of an aromatic amino carboxylic acid having 7 to 25 carbon atoms; any of said amino carboxylic acids optionally contains further hetero atoms in its skeleton; and the radicals $Z_1$ and $Z_2$ independently of one another have one of the definitions given for $X_1$.

2. The extruded air cooled blown film according to claim 1, having
   d) a Modulus according to EN ISO 527 enhanced by at least 10% versus a reference film without a nucleating agent of the formula (IA), (IB), or (IC).

3. The extruded air cooled blown film according to claim 1, comprising 20 to 100% by weight, relative to its total weight, of a polypropylene homopolymer or copolymer.

4. The extruded air cooled blown film according to claim 1, wherein
   layer L contains a polypropylene homopolymer, random copolymer, alternating or segmented copolymer, a block copolymer or a blend of polypropylene with another synthetic polymer.

5. The extruded air cooled blown film according to claim 1, wherein
   the layer L contains a propylene copolymer with ethylene at an ethylene content of 0.5 to 15% by weight, relative to the total weight of the propylene copolymer.

6. The extruded air cooled blown film according to claim 1, wherein
   the polypropylene homopolymer or copolymer has a melt flow rate of 0.3 to 5 dg/min at 230° C. and 2.16 kg according to ASTM D1238.

7. The extruded air cooled blown film according to claim 1, wherein the film structure contains at least one coextruded layer of low-, linear-low- or high-density polyethylene (LDPE, LLDPE, HDPE) or metallocene polyethylene, adjacent to the layer of polypropylene.

8. The extruded air cooled blown film according to claim 1, consisting of 3 coextruded layers, the layer L is the inner layer and two layers S1 and S2 are the outer layers, the layers 51 and S2 contain at least 50% of low-, linear-low- or high-density polyethylene (LDPE, LLDPE, HDPE) or metallocene polyethylene (m-PE) or any mixture thereof.

9. The extruded air cooled blown film according to claim 1, wherein one or more layers contain ethylene vinyl alcohol copolymer (EVOH), ethylene vinyl acetate copolymer (EVA), maleic anhydride grafted polypropylene or polyethylene, copolymers of acrylic-acid esters with propylene or ethylene, acrylic acid copolymers with propylene or ethylene, polyvinylidene chloride (PVDC), polyamide, or polyester.

10. The extruded air cooled blown film according to claim 1, which contains additionally one or more adhesive layer.

11. The extruded air cooled blown film according to claim 1, having a Modulus according to EN ISO 527 enhanced in longitudinal direction by at least 10% versus a reference film without a nucleating agent of the formula (IA), (IB), or (IC).

12. The extruded air cooled blown film according to claim 1, having a Modulus according to EN ISO 527 enhanced in transversal direction by at least 10% versus a reference film without a nucleating agent of the formula (IA), (IB), or (IC).

13. The extruded air cooled blown film according to claim 1, having
a Haze value according to ASTM D-1003 reduced by at least 10% relative to a reference film without a nucleating agent of the formula (IA), (IB), or (IC).

14. The extruded air cooled blown film according to claim 1, having
a Clarity value according to ASTM D-1746 enhanced by at least 0.5% relative to a reference film without a nucleating agent of the formula (IA), (IB), or (IC).

15. The extruded air cooled blown film according to claim 1, having
a Haze value according to ASTM D-1003 reduced by at least 10% relative to a reference film without a nucleating agent of the formula (IA), (IB), or (IC), and
a Clarity value according to ASTM D-1746 enhanced by at least 0.5% relative to a reference film without a nucleating agent of the formula (IA), (TB), or (IC).

16. The extruded air cooled blown film according to claim 1, comprising
one or more additives selected from the group consisting of
1) an anti-agglomerant,
2) an antioxidant,
3) an antistatic agent,
4) a slip- and anti-blocking agent,
5) an anti-fogging agent, and
6) a light stabilizer.

17. The extruded air cooled blown film according to claim 1, wherein
the layer L additionally contains one or more anti-agglomerants.

18. The extruded air cooled blown film according to claim 1, wherein
x, y or the sum of z' and z" are 2 or 3, and
when x, y or the sum of z' and z" are 2, $X_0$, $Y_0$, and $Z_0$ are the group of formula

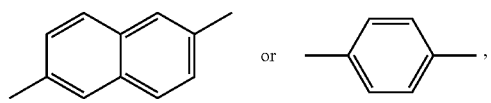

and when x, y or the sum of z' and z" are 3, $X_0$, $Y_0$, and $Z_0$ are the group of formula

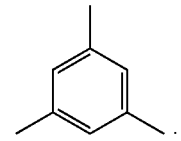

19. The extruded air cooled blown film according to claim 1, wherein
the radicals $X_1$, $Y_1$, $Z_1$ and $Z_2$ independently of one another are
$C_1$-$C_{10}$alkyl unsubstituted or substituted by 1, 2 or 3 hydroxy, amino and/or nitro;
$C_2$-$C_{20}$alkenyl unsubstituted or substituted by 1, 2 or 3 hydroxy, amino and/or nitro;
$C_2$-$C_{10}$alkyl interrupted by oxygen;
$C_3$-$C_6$cycloalkyl unsubstituted or substituted by 1, 2, 3 or 4 $C_1$-$C_4$alkyl;
($C_3$-$C_6$cycloalkyl)-$C_1$-$C_{10}$alkyl unsubstituted or substituted by 1, 2 or 3 $C_1$-$C_4$alkyl;
bis[$C_3$-$C_6$cycloalkyl]-$C_1$-$C_{10}$alkyl unsubstituted or substituted by 1, 2 or 3 $C_1$-$C_4$alkyl;

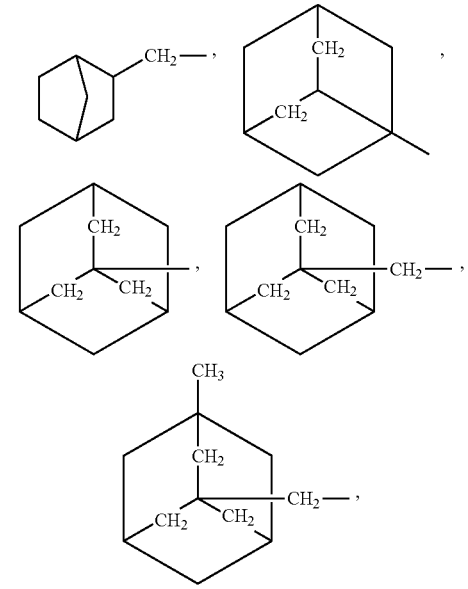

phenyl unsubstituted or substituted by 1, 2 or 3 radicals selected from $C_1$-$C_4$alkyl, $C_1$-$C_4$alkoxy, $C_1$-$C_4$alkylamino, di($C_1$-$C_4$alkyl)amino, amino, hydroxy and nitro;
phenyl-$C_1$-$C_{10}$alkyl unsubstituted or substituted by 1, 2 or 3 radicals selected from $C_1$-$C_4$alkyl, $C_3$-$C_6$cycloalkyl, phenyl, $C_1$-$C_4$alkoxy, hydroxy, amino and nitro;
phenylethenyl unsubstituted or substituted by 1, 2 or 3 $C_1$-$C_4$alkyl;
biphenyl-($C_1$-$C_{10}$alkyl) unsubstituted or substituted by 1, 2 or 3 $C_1$-$C_4$alkyl;
naphthyl unsubstituted or substituted by 1, 2 or 3 $C_1$-$C_4$alkyl;
naphthyl-$C_1$-$C_{10}$alkyl unsubstituted or substituted by 1, 2 or 3 $C_1$-$C_4$alkyl;

naphthoxymethyl unsubstituted or substituted by 1, 2 or 3 $C_1$-$C_4$alkyl;

biphenylenyl, fluorenyl, anthryl;

3-pyridinyl, 4-pyridinyl, 2-hydroxypyridin-3-yl, 3-quinolinyl, 4-quinolinyl, 2-furyl, 3-furyl, 1-methyl-2-pyrryl;

1-bromo-2-methylpropyl, dichloromethyl, pentafluoroethyl, 3,5-bis[trifluoromethyl]phenyl, 2,3,5,6-tetrafluoro-p-tolyl, 2,3-dichlorophenyl, 3,4-dichlorophenyl or 2,4-bis[trifluoromethyl]phenyl;

tri($C_1$-$C_{10}$alkyl)silyl; or tri($C_1$-$C_{10}$alkyl)silyl($C_1$-$C_{10}$alkyl).

20. The extruded air cooled blown film according to claim 1, wherein
the radicals $X_1$, $Y_1$, $Z_1$ and $Z_2$ independently of one another are branched $C_3$-$C_{10}$alkyl;
$C_3$-$C_{10}$alkyl interrupted by oxygen;
$C_3$-$C_6$cycloalkyl unsubstituted or substituted by 1, 2, 3 or 4 $C_1$-$C_4$alkyl;
(C3-C6cycloalkyl)-$C_1$-$C_{10}$alkyl unsubstituted or substituted by 1, 2 or 3 $C_1$-$C_4$alkyl;

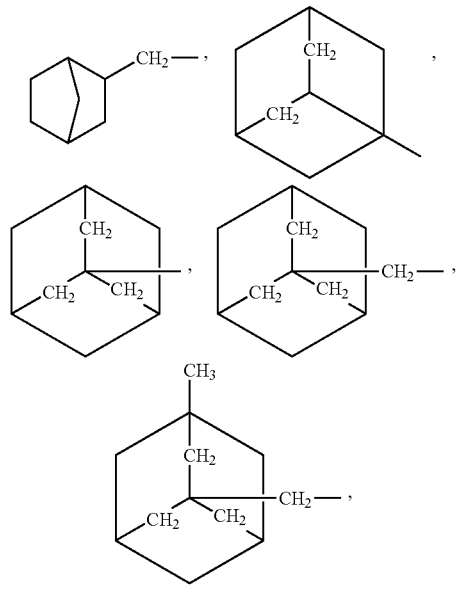

phenyl unsubstituted or substituted by 1, 2 or 3 $C_1$-$C_4$alkyl;
phenyl-$C_1$-$C_{10}$alkyl unsubstituted or substituted by 1, 2 or 3 radicals selected from $C_1$-$C_4$alkyl and $C_1$-$C_4$alkoxy;
biphenyl-($C_1$-$C_{10}$alkyl);
naphthyl-$C_1$-$C_{10}$alkyl;
tri($C_1$-$C_{10}$alkyl)silyl; or
tri($C_1$-$C_4$alkyl)silyl($C_1$-$C_5$alkyl).

21. The extruded air cooled blown film according to claim 1, wherein the nucleating agent is a compound of the formula (IA),
x is 2 or 3,
when x is 2, $X_0$ is the group of the formula

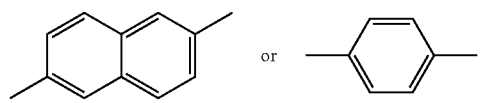

,and when x is 3, $X_0$ is the group of the formula

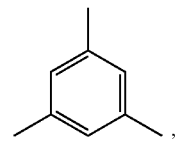

and the radicals $X_1$ independently of one another are n-propyl, i-propyl, n-butyl, 1,1-dimethylethyl, 1-methylpropyl, 2-methylpropyl, n-pentyl, 1,1-dimethylpropyl, 1,2-dimethylpropyl, 2,2-dimethylpropyl, 1-ethylpropyl, 1-methylbutyl, 2-methylbutyl, 3-methylbutyl, n-hexyl, 2,2-dimethylbutyl, 3,3-dimethylbutyl, 2-ethylbutyl, 2-ethylhexyl, 5-ethylhexyl, n-octyl, 1,1,3,3-tetramethylbutyl, 2,2,4-trimethylpentyl, 3,7-dimethyloctyl, cyclobutyl, cyclopentyl, cyclohexyl, 2-methyl-cyclohexyl, 3-methyl-cyclohexyl, 4-methyl-cyclohexyl, 2,3-dimethyl-cyclohexyl, 3,3,5-trimethyl-cyclohexyl, 1-cyclohexyl-ethyl, cycloheptyl, cyclooctyl, cyclododecyl, phenyl, benzyl, 1-phenylethyl, 2-phenylethyl, cumyl, 2-methylphenyl, 3-methylphenyl, 4-methylphenyl, 2-ethylphenyl, 3-ethylphenyl, 4-ethylphenyl, 2,3-dimethylphenyl, 3,5-dimethylphenyl, 2,3,5-trimethylphenyl, 2,4,6-trimethyl-phenyl, 4-n-butylphenyl, 4-tert-butylphenyl, 4-methoxyphenyl.

22. The extruded air cooled blown film according to claim 1, wherein the nucleating agent is a compound of the formula (IB),
y is 2 or 3,
when y is 2, $Y_0$ is the group of formula

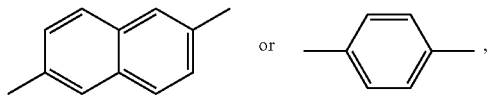

and
when y is 3, $Y_0$ is the group of formula

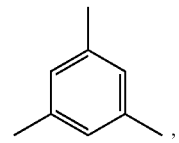

and the radicals $Y_1$ independently of one another are n-propyl, i-propyl, n-butyl, 1,1-dimethylethyl, 1-methylpropyl, 2-methylpropyl, n-pentyl, 1,1-dimethylpropyl, 1,2-dimethylpropyl, 2,2-dimethylpropyl, 1-ethylpropyl, 1-methylbutyl, 2-methylbutyl, 3-methylbutyl, n-hexyl, 2,2-dimethylbutyl, 3,3-dimethylbutyl, 2-ethylbutyl, 2-ethylhexyl, 5-ethylhexyl, n-octyl, 1,1,3,3-tetramethylbutyl, 2,2,4-trimethylpentyl, 3,7-dimethyloctyl, cyclobutyl, cyclopentyl, cyclohexyl, 2-methyl-cyclohexyl, 3-methyl-cyclohexyl, 4-methyl-cyclohexyl, 2,3-dimethyl-cyclohexyl, 3,3,5-trimethyl-cyclohexyl, 1-cyclohexyl-ethyl, cycloheptyl, cyclooctyl, cyclododecyl, phenyl, benzyl, 1-phenylethyl, 2-phenylethyl, cumyl, 2-methylphenyl, 3-methylphenyl, 4-methylphenyl, 2-ethylphenyl, 3-ethylphenyl, 4-ethylphenyl, 2,3-dimethylphenyl, 3,5-dimethylphenyl, 2,3,5-trimethylphenyl, 2,4,6-trimethyl-phenyl, 4-n-butylphenyl, 4-tert-butylphenyl, 4-methoxyphenyl.

23. The extruded air cooled blown film according to claim 1, wherein the nucleating agent is a compound of the formula (IC), z' and z" independently of one another are 1 or 2, and when the sum of z' and z" is 2, $Z_0$ is the group of formula

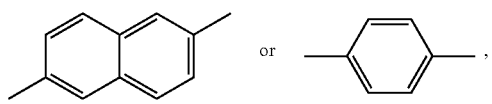

and when the sum of z' and z" is 3, $Z_0$ is the group of formula

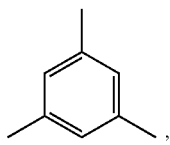

and the radicals $Z_1$ and $Z_2$ independently of one another are n-propyl, i-propyl, n-butyl, 1,1-dimethylethyl, 1-methylpropyl, 2-methylpropyl, n-pentyl, 1,1-dimethylpropyl, 1,2-dimethylpropyl, 2,2-dimethylpropyl, 1-ethylpropyl, 1-methylbutyl, 2-methylbutyl, 3-methylbutyl, n-hexyl, 2,2-dimethylbutyl, 3,3-dimethylbutyl, 2-ethylbutyl, 2-ethylhexyl, 5-ethylhexyl, n-octyl, 1,1,3,3-tetramethylbutyl, 2,2,4-trimethylpentyl, 3,7-dimethyloctyl, cyclobutyl, cyclopentyl, cyclohexyl, 2-methylcyclohexyl, 3-methyl-cyclohexyl, 4-methyl-cyclohexyl, 2,3-dimethyl-cyclohexyl, 3,3,5-trimethyl-cyclohexyl, 1-cyclohexyl-ethyl, cycloheptyl, cyclooctyl, cyclododecyl, phenyl, benzyl, 1-phenylethyl, 2-phenylethyl, cumyl, 2-methylphenyl, 3-methylphenyl, 4-methylphenyl, 2-ethylphenyl, 3-ethylphenyl, 4-ethylphenyl, 2,3-dimethylphenyl, 3,5-dimethylphenyl, 2,3,5-trimethylphenyl, 2,4,6-trimethyl-phenyl, 4-n-butylphenyl, 4-tert-butylphenyl, 4-methoxyphenyl.

24. The extruded air cooled blown film according to claim 1, wherein the nucleating agent is a compound of the formula (IA) wherein x is 3, $X_0$ is the group of the formula

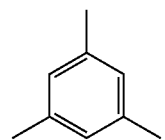

and the radicals $X_1$ are tert-octyl.

25. The extruded air cooled blown film according to claim 1, wherein the nucleating agent is a compound of the formula (IB) wherein y is 3, $Y_0$ is the group of the formula

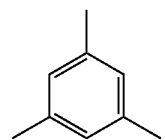

and the radicals $Y_1$ are tert-butyl.

* * * * *